US011764006B2

(12) United States Patent
Ting et al.

(10) Patent No.: US 11,764,006 B2

(45) Date of Patent: Sep. 19, 2023

(54) ACTIVATION ASSEMBLY, BUTTON, AND KEYBOARD

(71) Applicant: WISTRON CORP., New Taipei (TW)

(72) Inventors: Shih Ting Ting, New Taipei (TW); Yuyin Liu, New Taipei (TW); Zhuhua Lu, New Taipei (TW); Minghui Xu, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 17/403,943

(22) Filed: Aug. 17, 2021

(65) Prior Publication Data

US 2022/0375702 A1 Nov. 24, 2022

(30) Foreign Application Priority Data

May 24, 2021 (CN) ......................... 202110566248.4

(51) Int. Cl.
*H01H 13/705* (2006.01)
*H01H 13/85* (2006.01)

(52) U.S. Cl.
CPC .......... *H01H 13/705* (2013.01); *H01H 13/85* (2013.01)

(58) Field of Classification Search
CPC ........ H01H 13/00; H01H 13/14; H01H 13/20; H01H 13/28; H01H 13/285; H01H 13/30; H01H 13/50; H01H 13/52; H01H 13/70; H01H 13/7006; H01H 13/705; H01H 13/85; H01H 13/86; H01H 2215/00; H01H 3/00;

(Continued)

(56) References Cited

U.S. PATENT DOCUMENTS 5,564,560 A * 10/1996 Minelli ................ H01H 13/702 200/519
5,898,147 A * 4/1999 Domzalski ............. H01H 13/64 200/1 B (Continued)

FOREIGN PATENT DOCUMENTS

| | | | |
|---|---|---|---|
| CN | 206271567 | U | 6/2017 |
| CN | 108666163 | A | 10/2018 |
| TW | I616916 | B | 3/2018 |

OTHER PUBLICATIONS

TW Office Action dated Feb. 11, 2022 in Taiwan application No. 110119467.

(Continued)

*Primary Examiner* — Anthony R Jimenez
(74) *Attorney, Agent, or Firm* — McClure, Qualey & Rodack, LLP

(57) ABSTRACT

An activation assembly is configured to be assembled with a substrate and a keycap. The activation assembly includes a flexible guiding component and an elastic component. The flexible guiding component includes a covering portion, a first contact portion, and a second contact portion. The covering portion has a plurality of openings. The covering portion is configured to be mounted on the substrate. The first contact portion and the second contact portion are respectively located at two opposite sides of the covering portion. The elastic component includes a coupling portion and a plurality of support portions. The coupling portion is connected to the covering portion. The support portions are connected to the coupling portion and are respectively located in the openings.

18 Claims, 23 Drawing Sheets

10

120 O 111 110 112 113 100 O O 112 113 211 221 222 220 210 200 221 220 222

10

220 211 210 220 221 222 O O S 111 112 110 113 200 100 220 O 220 O 130

(58) Field of Classification Search
CPC .. H01H 3/12; H01H 2003/12; H01H 2013/00; H01H 2013/02; H01H 2013/50; H01H 2013/52; H01H 2215/004; H01H 2215/034; H01H 2215/036
USPC ........................................................ 200/5 A
See application file for complete search history.

(56) References Cited

U.S. PATENT DOCUMENTS 6,423,918 B1 * 7/2002 King ...................... H01H 13/48 200/406
2018/0358193 A1 12/2018 Chen et al.

OTHER PUBLICATIONS

Indian Office Action dated Dec. 16, 2022 in Indian application No. 202134050612.

* cited by examiner 10
100
110
111
112
113
120
200
O
5

ACTIVATION ASSEMBLY, BUTTON, AND KEYBOARD

CROSS-REFERENCE TO RELATED APPLICATIONS

This non-provisional application claims priority under 35 U.S.C. § 119(a) on Patent Application No(s). 202110566248.4 filed in China on May 24, 2021, the entire contents of which are hereby incorporated by reference.

TECHNICAL FIELD

The disclosure provides an activation assembly, a button, and a keyboard, more particularly to an activation assembly having an elastic component, a button having the activation assembly and a keyboard having the button.

BACKGROUND

Regarding to a personal computer, a keyboard is one of the common input devices for inputting words, symbols or number. Not only that, in electronic device of other types in daily life or a processing apparatus in industry, buttons are generally adopted for serving as the input device to operate the electronic device or the process apparatus.

However, in order to achieve a slim electronic device, the manufacturers have confronted the issue of how to reduce the height of the buttons and improve the tactile feedback.

SUMMARY OF THE INVENTION

The disclosure provides a keyboard, a button, and an activation assembly whose height is favorable for slim design and achieving an improved tactile feedback.

One embodiment of the disclosure provides an activation assembly of a button. The activation assembly is configured to be assembled with a substrate and a keycap. The activation assembly includes a flexible guiding component and an elastic component. The flexible guiding component includes a covering portion, a first contact portion, and a second contact portion. The covering portion has a plurality of openings. The covering portion is configured to be mounted on the substrate. The first contact portion and the second contact portion are respectively located at two opposite sides of the covering portion. The elastic component includes a coupling portion and a plurality of support portions. The coupling portion is connected to the covering portion. The support portions are connected to the coupling portion and are respectively located in the openings.

Another embodiment provides a button. The button includes a support base, a substrate, an activation assembly, a restoring component, and a keycap. The substrate is mounted on the support base and has a circuit. The activation assembly includes a flexible guiding component and elastic component. The flexible guiding component includes a covering portion, a first contact portion, and a second contact portion. The covering portion has a plurality of openings, the covering portion is mounted on the substrate, the first contact portion and the second contact portion are respectively located at two opposite sides of the covering portion. The elastic component includes a coupling portion and a plurality of support portions. The coupling portion is connected to the covering portion. The support portions are connected to the coupling portion and are respectively located in the openings. A side of the restoring component is mounted on the support base. The keycap is mounted on another side of the restoring component. The keycap is movable relative to the support base via the restoring component to move the second contact portion of the activation assembly to touch the circuit.

Still another embodiment provides a key board. The keyboard includes a casing and a plurality of buttons. The buttons are disposed on the casing. Each of the buttons includes a support base, a substrate, an activation assembly, a restoring component, and a keycap. The substrate is mounted on the support base and has a circuit. The activation assembly includes a flexible guiding component and elastic component. The flexible guiding component includes a covering portion, a first contact portion, and a second contact portion. The covering portion has a plurality of openings, the covering portion is mounted on the substrate, the first contact portion and the second contact portion are respectively located at two opposite sides of the covering portion. The elastic component includes a coupling portion and a plurality of support portions. The coupling portion is connected to the covering portion. The support portions are connected to the coupling portion and are respectively located in the openings. A side of the restoring component is mounted on the support base. The keycap is mounted on another side of the restoring component. The keycap is movable relative to the support base via the restoring component to move the second contact portion of the activation assembly to touch the circuit.

According to the key board, the button, and activation assembly disclosed in the above embodiments, the elastic component is held in position by the flexible guiding component; meanwhile, the flexible guiding component has the openings to avoid interference with the support portions of the elastic component during the deformation of the elastic component, such that the installation and the movement of the elastic component can be achieved by the flexible guiding component without any additional frame component. Therefore, the button can have a lower height for achieving a slim design and improving the tactile feedback.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
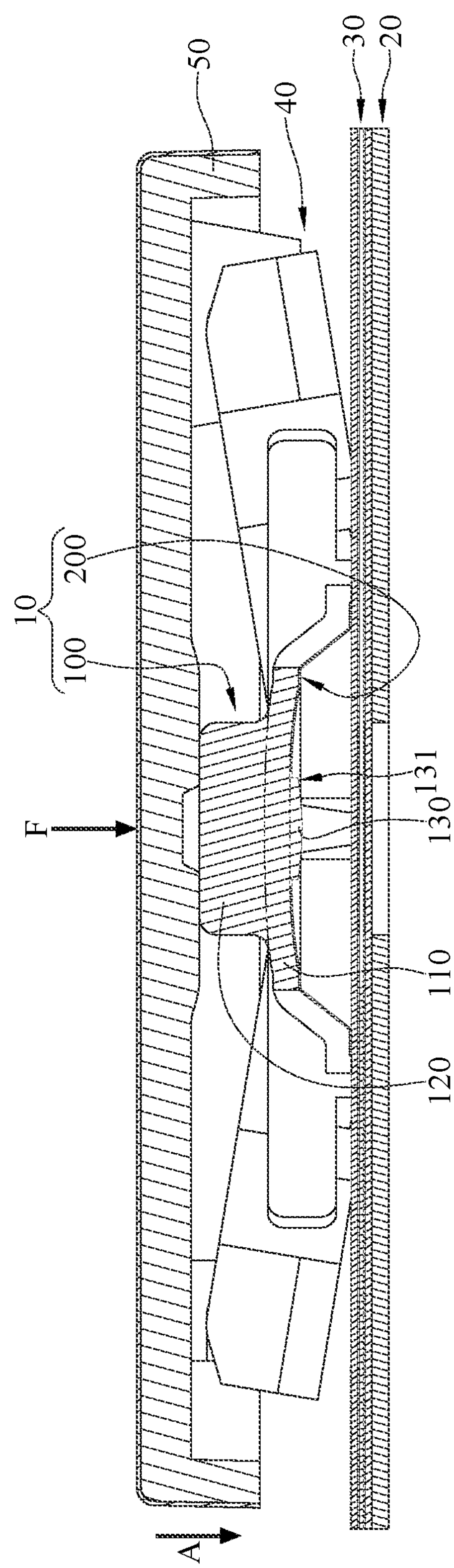
FIG. 1 is a cross-sectional view of a button according to a first embodiment of the disclosure.
Figure 2:
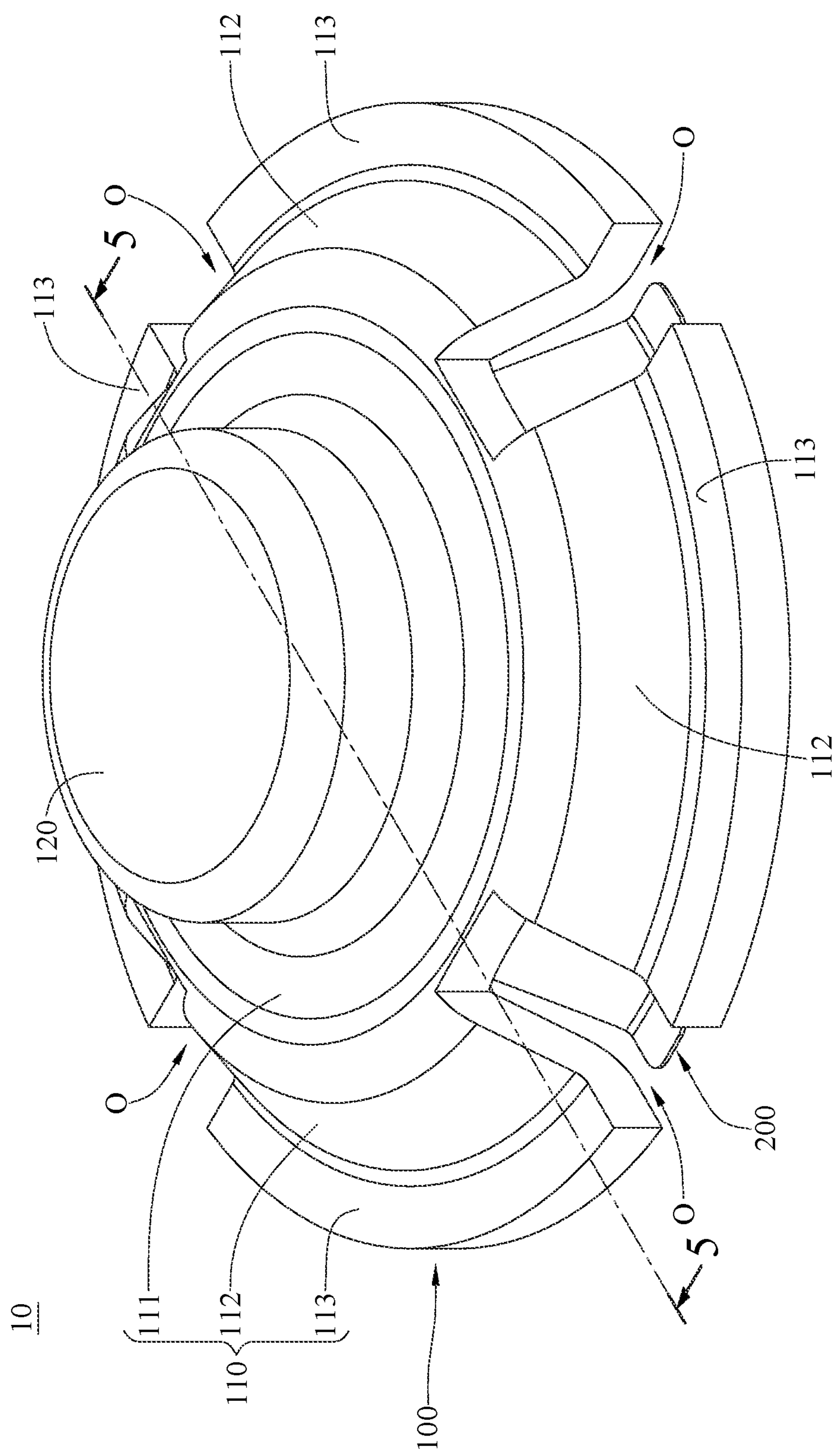
FIG. 2 is a perspective view of an activation assembly of the button in FIG. 1.
Figure 3:
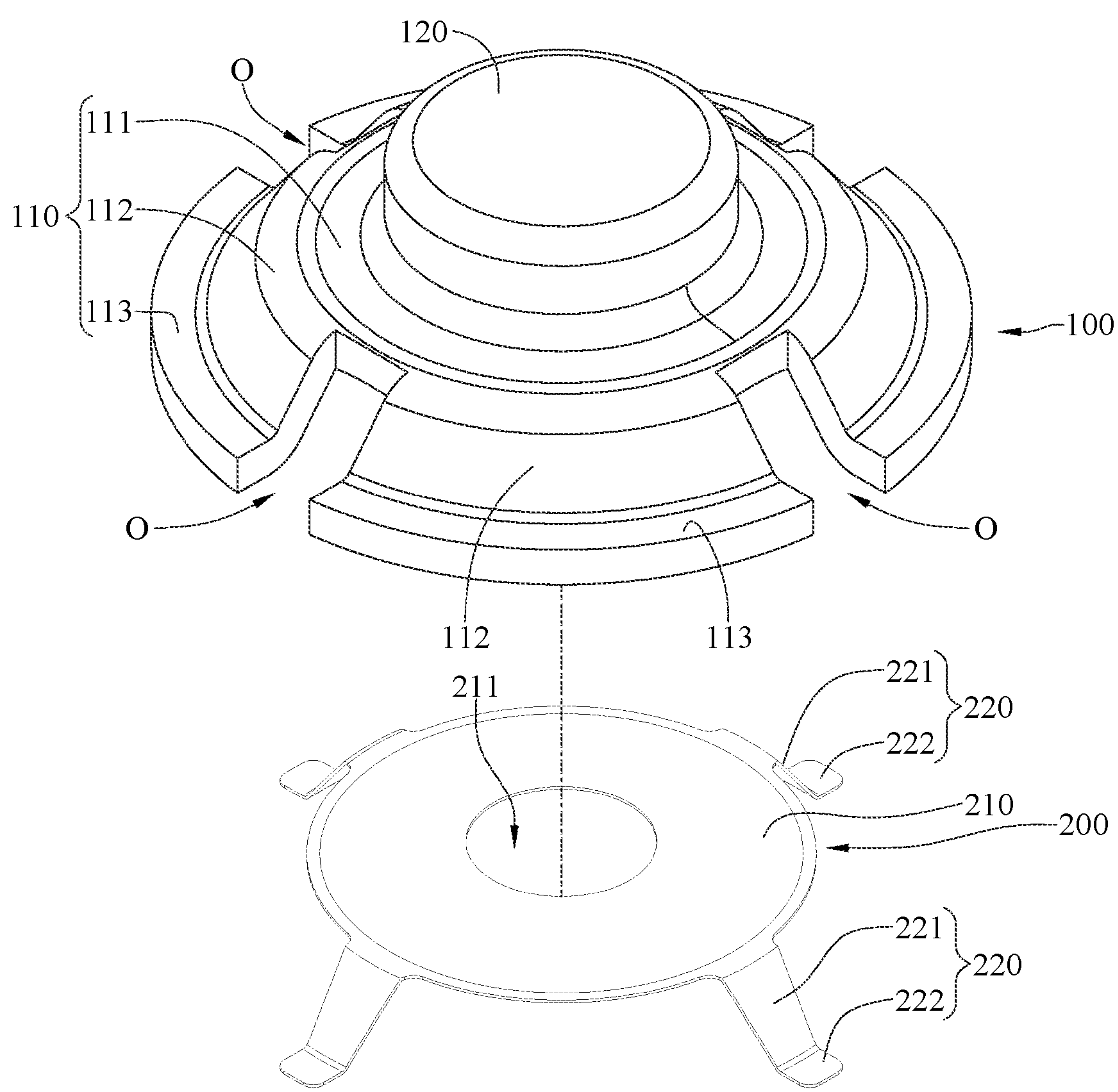
FIG. 3 is an exploded view of the activation assembly in FIG. 2.
Figure 4:
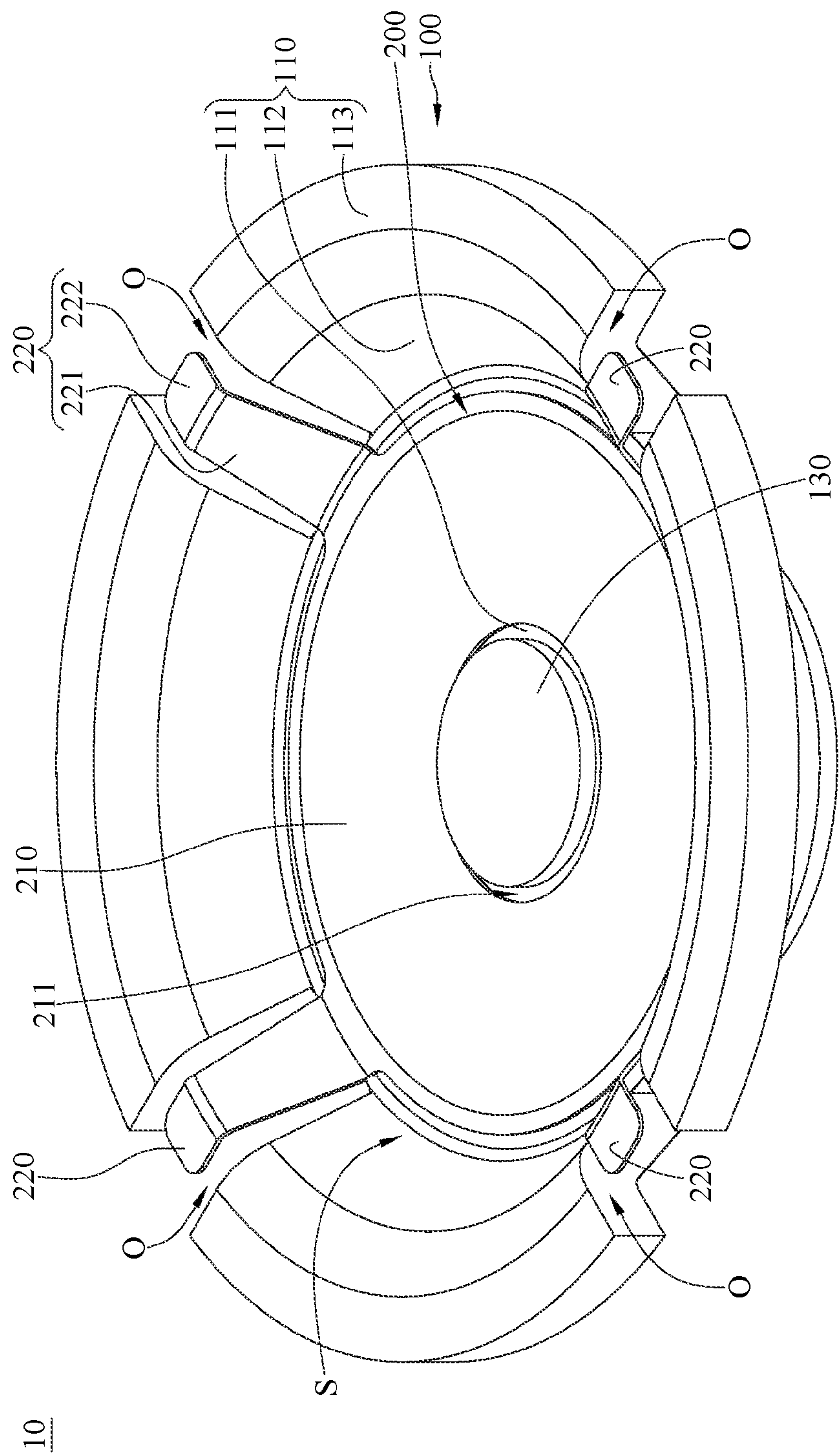
FIG. 4 is another exploded view of the activation assembly in FIG. 2.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Referring to FIGS. 1 to 6, there are shown a cross-sectional view of a button 1 according to a first embodiment of the disclosure, a perspective view of an activation assembly 10 of the button 1, exploded views of the activation assembly 10, a cross-sectional view of the activation assembly 10 taken along line 5-5, and a cross-sectional view of the activation assembly 10 when being pushed.

The button 1 may be served as a key of a keyboard of a notebook computer or a desktop computer. The button 1 includes a support base 20, a substrate 30, an activation assembly 10, a restoring component 40, and a keycap 50. The substrate 30 may be a circuit board. The substrate 30 is disposed on the support base 20 and may have a circuit (not shown) for transmitting signal caused by the activation assembly 10. The activation assembly 10 is disposed on the substrate 30. The restoring component 40 is arranged between the support base 20 and the keycap 50. The restoring component 40 is, for example, a scissor like structure that can force the keycap 50 and the support base 20 to move away from each other. Also, the restoring component 40 is deformable by force, when the keycap 50 is moved towards the support base 20, the restoring component 40 is deformed and stores restoring force, and the activation assembly 10 is moved to touch the circuit of the substrate 30. The detail will be provided in following paragraphs.

As shown in FIGS. 2 to 5, the activation assembly 10 includes a flexible guiding component 100 and an elastic component 200. The flexible guiding component 100 includes a covering portion 110, a first contact portion 120, and a second contact portion 130. The covering portion 110 has a cavity S and a plurality of openings O connected to the cavity S. The covering portion 110 is fixed to the substrate 30. The first contact portion 120 and the second contact portion 130 are respectively arranged on two opposite sides of the covering portion 110. Specifically, the first contact portion 120 may be a protrusion protruding outwards from a surface of the covering portion 110 facing away from the cavity S; the second contact portion 130 may be another protrusion located in the cavity S. The first contact portion 120 is configured to contact the keycap 50. When the keycap 50 pushes the first contact portion 120, the second contact portion 130 is forced to touch the circuit of the substrate 30. In more detail, the covering portion 110 may further include a first covering part 111, a plurality of second covering parts 112, and a plurality of coupling parts 113. The second covering parts 112 are connected to the first covering part 111, and the second covering parts 112 are spaced apart from one another. Each of the openings O is formed between adjacent two of the second covering parts 112. The coupling parts 113 are respectively connected to the second covering parts 112. The coupling parts 113 are connected to the first covering part 111 via the second covering parts 112. The flexible guiding component 100 is fixed to the substrate 30 via the coupling parts 113. The coupling parts 113 are fixed to the substrate 30 via, for example, adhesive or any suitable means. The second contact portion 130 has a convex curved surface 131 located at a side of the second contact portion 130 away from the first covering part 111. That is, the convex curved surface 131 protrudes towards a direction opposite to the first covering part 111. The convex curved surface 131 is provided to make the force from the second contact portion 130 concentrated at the substrate 30, thereby making the touch of the second contact portion 130 much more effective.

Note that the convex curved surface 131 of the second contact portion 130 may be modified as required; in some other embodiments, the surface of the second contact portion that faces away from the first covering part may be a flat surface.

Figure 5:
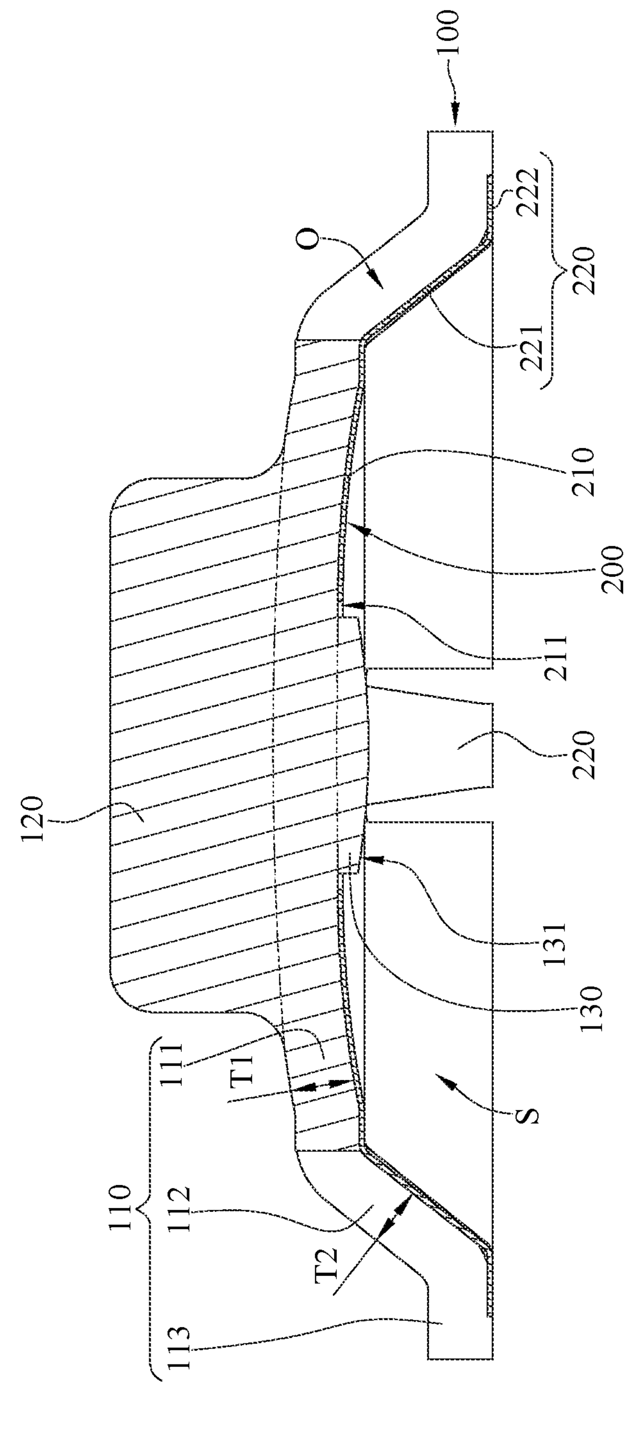
FIG. 5 is a cross-sectional view of the activation assembly in FIG. 2 taken along line 5-5.

As shown in FIG. 5, a thickness T1 of the first covering part 111 is substantially the same as a thickness T2 of each second covering part 112 to improve the tactile feedback. The first covering part 111 and the second covering parts 112 may have a thickness ranging from 0.2 millimeters to 0.5 millimeters. In one embodiment, the thicknesses T1 and T2 may be 0.3 millimeters. Note that the first covering part and the second covering parts may be different in thickness.

The flexible guiding component 100 may be made of rubber, but the present disclosure is not limited thereto; in some other embodiment, the flexible guiding component 100 may be made of Mylar or polyethylene terephthalate (i.e., PET). Compared to the flexible guiding component made of Mylar or PET, the flexible guiding component made of rubber has a longer lifespan and less noise when using.

The elastic component 200 may be made of any suitable metal, such as metal. The elastic component includes a coupling portion 210 and a plurality of support portions 220. The coupling portion 210 of the elastic component 200 has a hole 211. The coupling portion 210 is disposed on the first covering part 111 of the covering portion 110 and located in the cavity S, and the second contact portion 130 of the flexible guiding component 100 is disposed through the hole 211. The support portions 220 extend outwards from the coupling portion 210 and are respectively located at the openings O, such that the support portions 220 are movable within the openings O without being interfered by the flexible guiding component 100.

Figure 6:
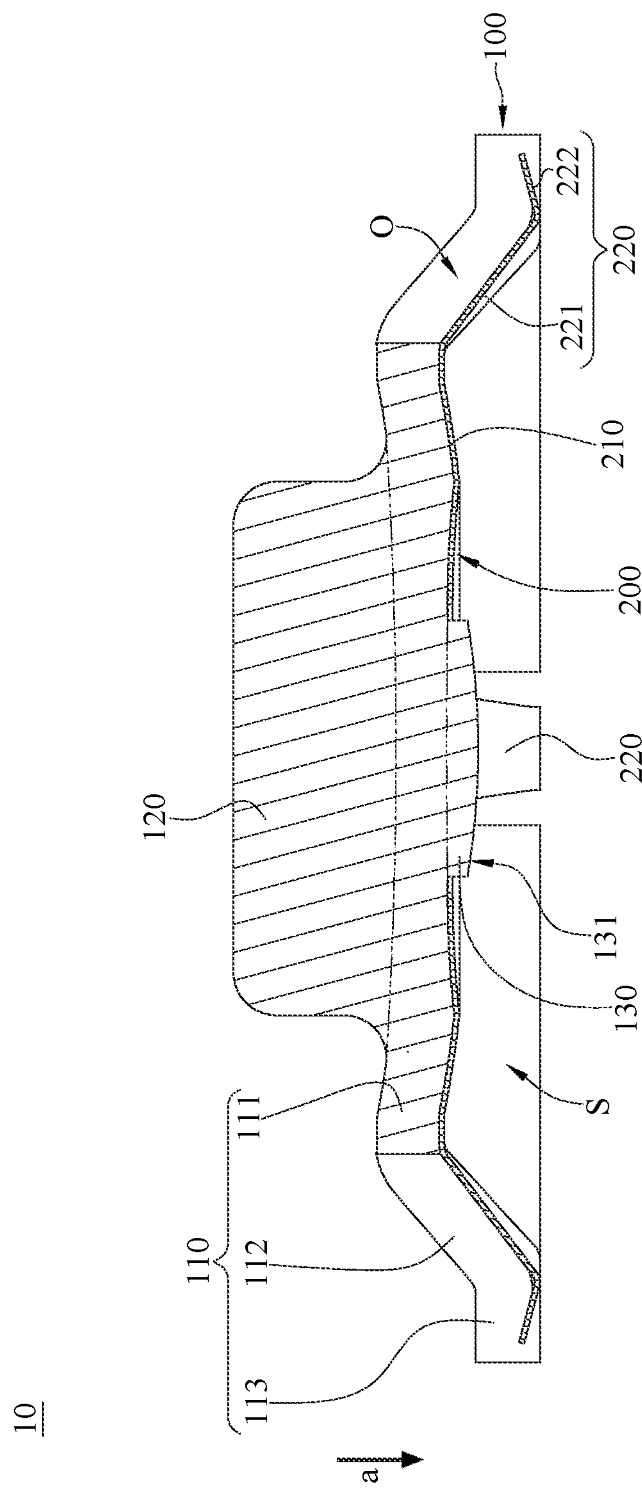
FIG. 6 is a cross-sectional view of the activation assembly of the button in FIG. 5 when being pushed.

As shown in FIGS. 1 and 6, when a force F is applied to push the keycap 50 downward (along a direction A), part of the flexible guiding component 100 and the coupling portion 210 of the elastic component 200 are deformed and moved in the same direction by the keycap 50, and the support portions 220 standing on the substrate 30 are forced to slide outward from the openings O. During this process, the elastic component 200 is compressed by the substrate 30 and the flexible guiding component 100. When the force F is canceled (i.e., when the keycap 50 is released), the flexible guiding component 100 recovers to its original shape, and the elastic component 200 can meanwhile help the flexible guiding component 100 restore to its original shape. The elastic response not only provides the button 1 a strong tactile feedback but also gives it a longer lifespan.

Each of the support portions 220 includes an inclined part 221 and a contact part 222, where the contact part 222 is flat and is connected to the coupling portion 210 via the inclined part 221. When the elastic component 200 is not yet deformed by the keycap 50, the contact part 222 is in contact with the substrate 30 via a flat surface thereof. This helps prevent the elastic component 200 from damaging the substrate 30 when using.

Note that the coupling portion 210 of the elastic component 200 may be placed in the required position by any suitable manner; in one embodiment, the coupling portion 210 may be simply placed on the flexible guiding component 100; in one embodiment, the coupling portion 210 may be fixed to the flexible guiding component 100 via adhesive; in one embodiment, the coupling portion 210 may be fixed to the flexible guiding component 100 by melting process.

In other words, the elastic component 200 is held in position by the flexible guiding component 100; meanwhile, as discussed above, the flexible guiding component 100 has the openings O to avoid interference with the support portions 220 of the elastic component 200 during the deformation of the elastic component 200, such that the installation and the movement of the elastic component 200 can be achieved by the flexible guiding component 100 without any additional frame component. Therefore, the button 1 can have a lower height for achieving a slim design and improving the tactile feedback.

In this embodiment, the coupling portion 210 of the elastic component 200 has a circular shape, but the present disclosure is not limited thereto; in some other embodiments, the coupling portion of the elastic component may have a square shape. In addition, the elastic component 200 have four support portions 220, but the present disclosure is not limited thereto; in some other embodiments, the elastic component may have any number of support portion.

Figure 7:
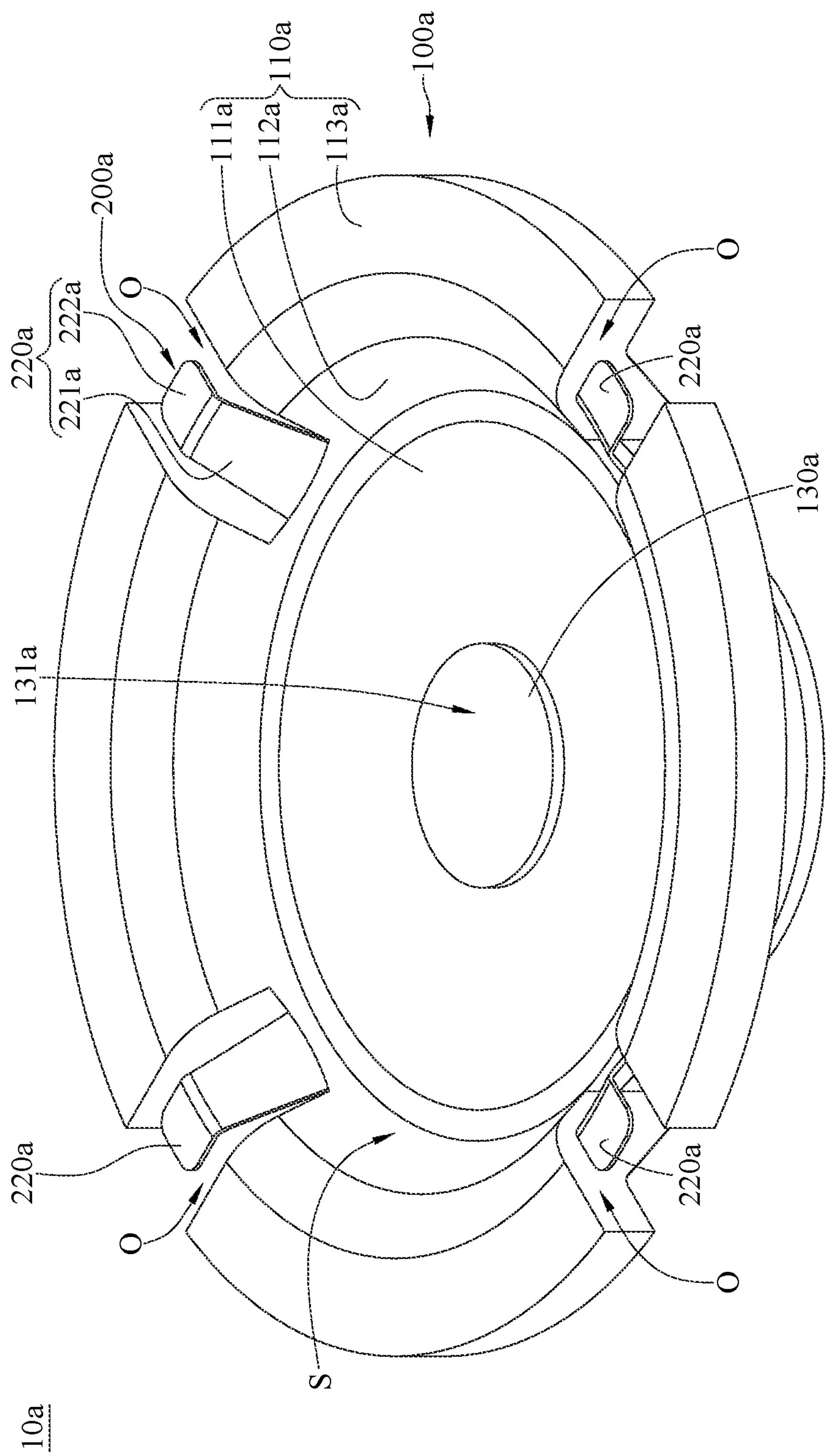
FIG. 7 is a perspective view of an activation assembly of a button according to a second embodiment of the disclosure.
Figure 8:
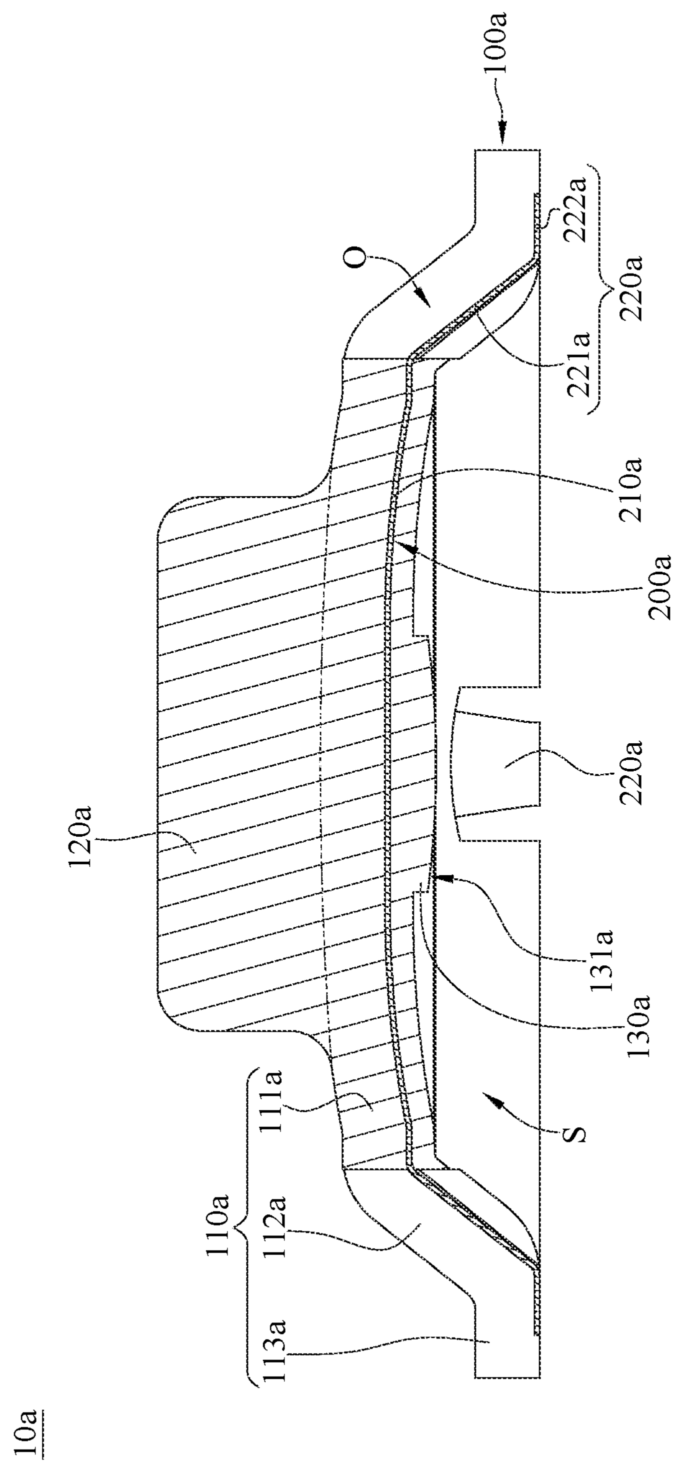
FIG. 8 is a cross-sectional view of the activation assembly of the button in FIG. 7.

Note that the flexible guiding component may hold the elastic component in position using other suitable manners. Referring to FIGS. 7 and 8, there are shown a perspective view of an activation assembly 10*a* of a button according to a second embodiment of the disclosure and a cross-sectional view of the activation assembly 10*a* of the button in FIG. 7. In this embodiment, the activation assembly 10 of the button 1 shown in FIG. 1 is replaced with the activation assembly 10*a*, and the connection and operation of the activation assembly 10*a* relative to the support base 20, the substrate 30, the restoring component 40, and the keycap 50 are the same as that of the activation assembly 10 relative to the support base 20, the substrate 30, the restoring component 40, and the keycap 50, thus the same part between them will not be repeatedly introduced. The following paragraphs mainly introduce the activation assembly 10*a* in detail.

In this embodiment, the activation assembly 10*a* includes a flexible guiding component 100*a* and an elastic component 200*a*.

The flexible guiding component 100*a* includes a covering portion 110*a*, a first contact portion 120*a*, and a second contact portion 130*a*. The covering portion 110*a* has a cavity S and a plurality of openings O connected to the cavity S. The covering portion 110*a* is fixed to the substrate 30 (as shown in FIG. 1). The first contact portion 120*a* and the second contact portion 130*a* are respectively arranged on two opposite sides of the covering portion 110*a*. Specifically, the first contact portion 120*a* may be a protrusion protruding outwards from a surface of the covering portion 110*a* facing away from the cavity S; the second contact portion 130*a* may be another protrusion located in the cavity S. The first contact portion 120*a* is configured to contact the keycap 50 (as shown in FIG. 1). When the keycap 50 pushes the first contact portion 120*a*, the second contact portion 130*a* is forced to touch the circuit of the substrate 30. In more detail, the covering portion 110*a* includes a first covering part 111*a*, a plurality of second covering parts 112*a*, and a plurality of coupling parts 113*a*. The second covering parts 112*a* are connected to the first covering part 111*a*, and the second covering parts 112*a* are spaced apart from one another. Each of the openings O is formed between adjacent two of the second covering parts 112*a*. The coupling parts 113*a* are respectively connected to the second covering parts 112*a*. The coupling parts 113*a* are connected to the first covering part 111*a* via the second covering parts 112*a*. The flexible guiding component 100*a* is fixed to the substrate 30 via the coupling parts 113*a*. The coupling parts 113*a* are fixed to the substrate 30 via, for example, adhesive or any suitable means. The second contact portion 130*a* has a convex curved surface 131*a* located at a side of the second contact portion 130*a* away from the first covering part 111*a*. That is, the convex curved surface 131*a* protrudes towards a direction opposite to the first covering part 111*a*. The convex curved surface 131*a* is provided to make the force from the second contact portion 130*a* concentrated at the substrate 30, thereby making the touch of the second contact portion 130*a* much more effective.

Note that the convex curved surface 131*a* of the second contact portion 130*a* may be modified as required; in some other embodiments, the surface of the second contact portion that faces away from the first covering part may be a flat surface.

In this embodiment, a thickness of the first covering part 111*a* is substantially the same as a thickness of each second covering part 112*a* to improve the tactile feedback. The first covering part 111*a* and the second covering parts 112*a* may have a thickness ranging from 0.2 millimeters to 0.5 millimeters. In one embodiment, the thickness of the first covering part 111*a* and the second covering parts 112*a* may be 0.3 millimeters. Note that the first covering part and the second covering parts may be different in thickness.

The flexible guiding component 100_a_ may be made of rubber, but the present disclosure is not limited thereto; in some other embodiment, the flexible guiding component 100_a_ may be made of Mylar or polyethylene terephthalate (i.e., PET). Compared to the flexible guiding component made of Mylar or PET, the flexible guiding component made of rubber has a longer lifespan and produce less noise when using.

The elastic component 200_a_ may be made of any suitable metal, such as metal. The elastic component 200_a_ includes a coupling portion 210_a_ and a plurality of support portions 220_a_.

The coupling portion 210_a_ of the elastic component 200_a_ is coupled with the first covering part 111_a_ of the covering portion 110_a_ via insert molding process. The support portions 220_a_ extend outwards from the coupling portion 210_a_ and are respectively located at the openings O, such that the support portions 220_a_ are movable within openings O without being interfered by the flexible guiding component 100_a_.

Each of the support portions 220_a_ includes an inclined part 221_a_ and a contact part 222_a_, where the contact part 222_a_ is flat and is connected to the coupling portion 210_a_ via the inclined part 221_a_. When the elastic component 200_a_ is not yet deformed by the keycap 50, the contact part 222_a_ is in contact with the substrate 30 (as shown in FIG. 1) via a flat surface of the contact part 222_a_. This helps prevent the elastic component 200_a_ from damaging the substrate 30 when using.

Figure 9:
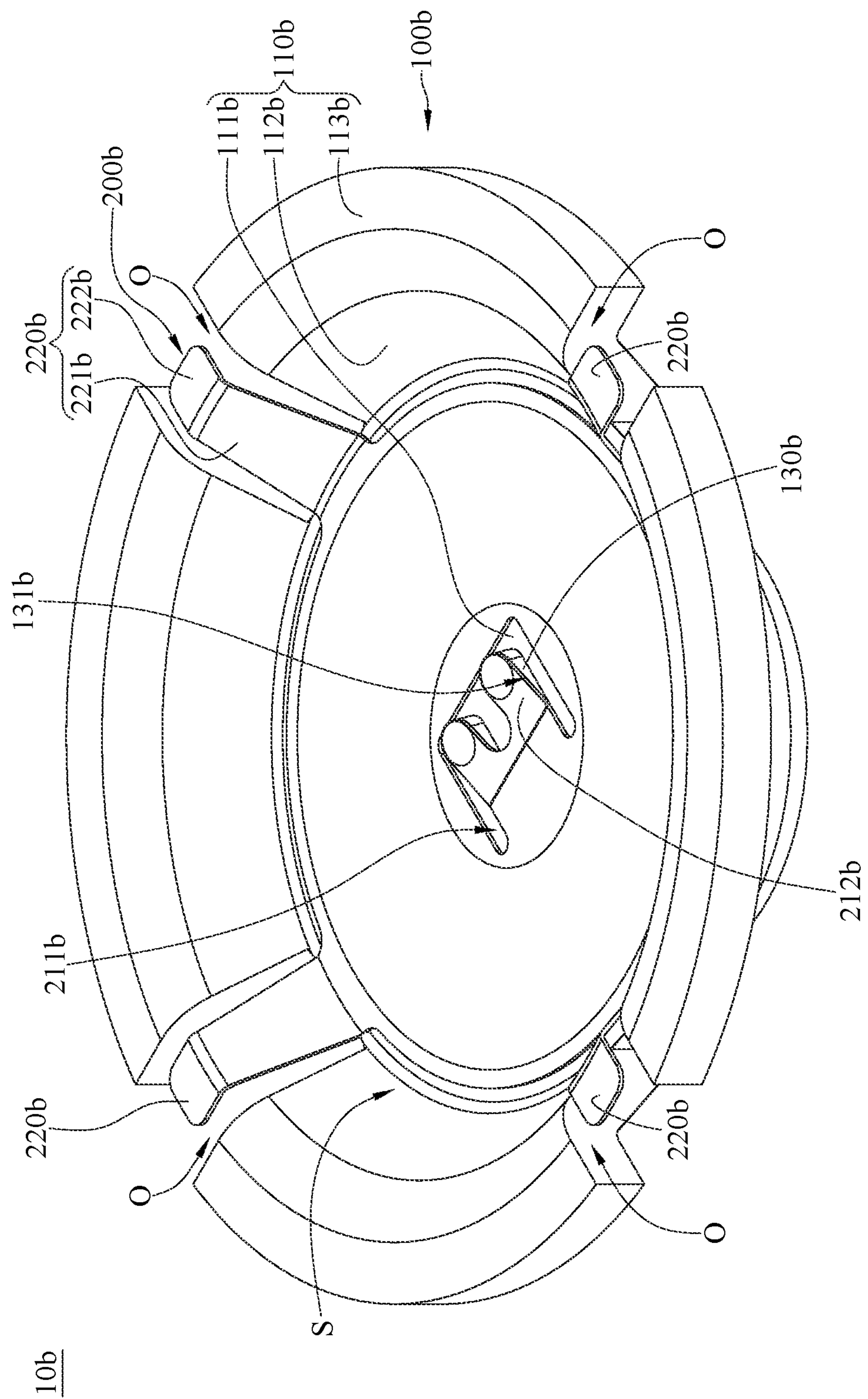
FIG. 9 is a perspective view of an activation assembly of a button according to a third embodiment of the disclosure.
Figure 10:
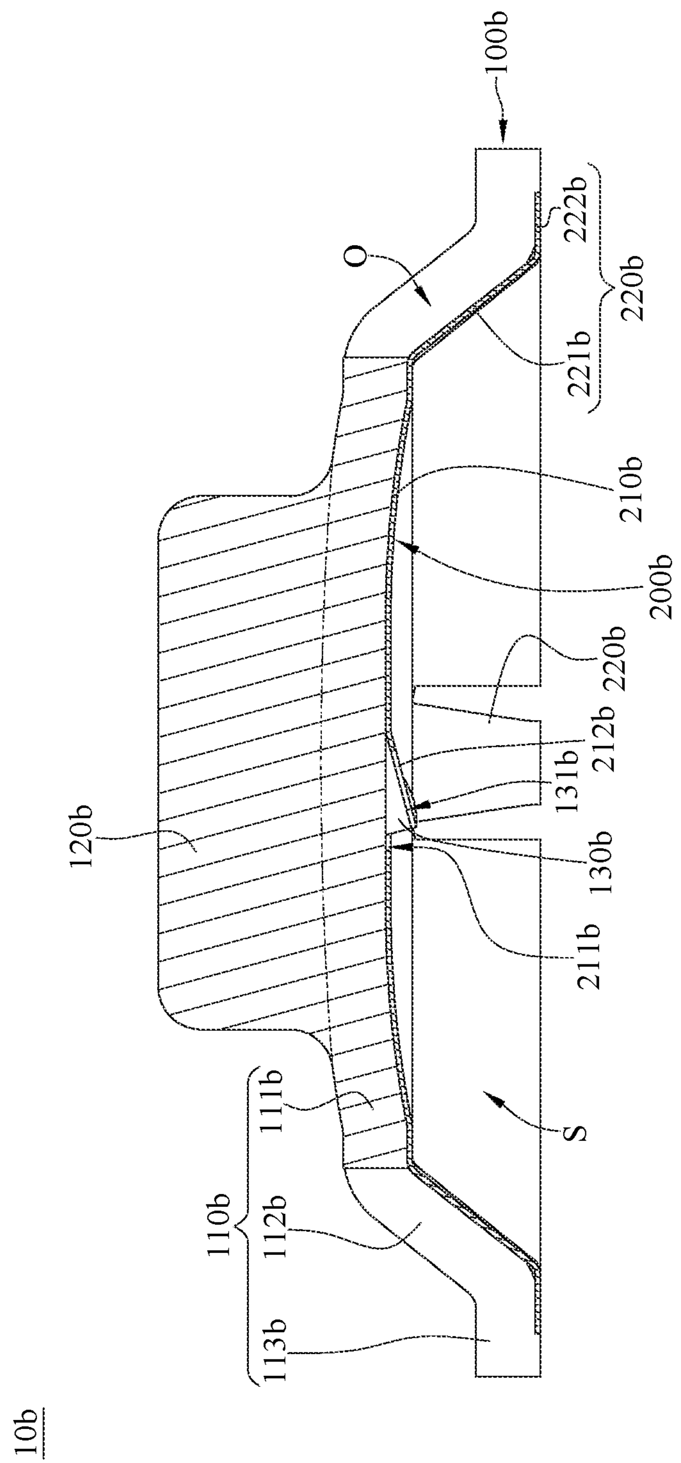
FIG. 10 is a cross-sectional view of the activation assembly of the button in FIG. 9.

In the aforementioned embodiment, the flexible guiding component 100 of the button 1 directly touches the circuit of the substrate 30, but the present disclosure is not limited thereto. Referring to FIGS. 9 and 10, there are shown a perspective view of an activation assembly 10_b_ of a button according to a third embodiment of the disclosure and a cross-sectional view of the activation assembly 10_b_ of the button in FIG. 9. In this embodiment, the activation assembly 10 of the button 1 shown in FIG. 1 is replaced with the activation assembly 10_b_, and the connection and operation of the activation assembly 10_b_ relative to the support base 20, the substrate 30, the restoring component 40, and the keycap 50 are the same as that of the activation assembly 10 relative to the support base 20, the substrate 30, the restoring component 40, and the keycap 50, thus the same part between them will not be repeatedly introduced. The following paragraphs mainly introduce the activation assembly 10_b_ in detail.

In this embodiment, the activation assembly 10_b_ includes a flexible guiding component 100_b_ and an elastic component 200_b_.

The flexible guiding component 100_b_ includes a covering portion 110_b_, a first contact portion 120_b_, and a second contact portion 130_b_. The covering portion 110_b_ has a cavity S and a plurality of openings O connected to the cavity S. The covering portion 110_b_ is fixed to the substrate 30 (as shown in FIG. 1). The first contact portion 120_b_ and the second contact portion 130_b_ are respectively arranged on two opposite sides of the covering portion 110_b_. Specifically, the first contact portion 120_b_ may be a protrusion protruding outwards from a surface of the covering portion 110_b_ facing away from the cavity S, and the second contact portion 130_b_ may be another protrusion located in the cavity S. The first contact portion 120_b_ is configured to contact the keycap 50 (as shown in FIG. 1). When the keycap 50 pushes the first contact portion 120_b_, the second contact portion 130_b_ is forced to touch the circuit of the substrate 30. In more detail, the covering portion 110_b_ includes a first covering part 111_b_, a plurality of second covering parts 112_b_, and a plurality of coupling parts 113_b_. The second covering parts 112_b_ are connected to the first covering part 111_b_, and the second covering parts 112_b_ are spaced apart from one another. Each of the openings O is formed between adjacent two of the second covering parts 112_b_. The coupling parts 113_b_ are respectively connected to the second covering parts 112_b_. The coupling parts 113_b_ are connected to the first covering part 111_b_ via the second covering parts 112_b_. The flexible guiding component 100_b_ is fixed to the substrate 30 via the coupling parts 113_b_. The coupling parts 113_b_ are fixed to the substrate 30 via, for example, adhesive or any suitable means. The second contact portion 130_b_ has an inclined surface 131_b_ located at a side of the second contact portion 130_b_ away from the first covering part 111_b_.

In this embodiment, a thickness of the first covering part 111_b_ is substantially the same as a thickness of each second covering part 112_b_ to improve the tactile feedback. The first covering part 111_b_ and the second covering parts 112_b_ may have a thickness ranging from 0.2 millimeters to 0.5 millimeters. In one embodiment, the thickness of the first covering part 111_b_ and the second covering parts 112_b_ may be 0.3 millimeters. Note that the first covering part and the second covering parts may be different in thickness.

The flexible guiding component 100_b_ may be made of rubber, but the present disclosure is not limited thereto; in some other embodiment, the flexible guiding component 100_b_ may be made of Mylar or polyethylene terephthalate (i.e., PET). Compared to the flexible guiding component made of Mylar and PET, the flexible guiding component made of rubber has a longer lifespan and produce less noise when using.

The elastic component 200_b_ may be made of any suitable metal, such as metal. The elastic component 200_b_ includes a coupling portion 210_b_ and a plurality of support portions 220_b_. The coupling portion 210_b_ of the elastic component 200_b_ has a hole 211_b_ and a pressing part 212_b_.

The coupling portion 210_b_ is disposed on the covering portion 110_b_ and located in the cavity S. The coupling portion 210_b_ may be simply placed on the covering portion 110_b_, or the coupling portion 210_d_ may be fixed to the covering portion 110_b_ via adhesive. The second contact portion 130_b_ of the flexible guiding component 100_b_ is disposed through the hole 211_b_, and the pressing part 212_b_ is attached on the inclined surface 131_b_ and is configured to contact the substrate 30. The support portions 220_b_ extend outwards from the coupling portion 210_b_ and are respectively located at the openings O, such that the support portions 220_b_ are movable within the openings O without being interfered by the flexible guiding component 100_b_.

Each of the support portions 220_b_ includes an inclined part 221_b_ and a contact part 222_b_, where the contact part 222_b_ is flat and is connected to the coupling portion 210_b_ via the inclined part 221_b_. When the elastic component 200_b_ is not yet deformed by the keycap 50, the contact part 222_b_ is in contact with the substrate 30 (as shown in FIG. 1) via a flat surface of the contact part 222_b_. This helps prevent the elastic component 200_b_ from damaging the substrate 30 when using.

Note that the manner used to dispose the coupling portion 210_b_ on the covering portion 110_b_ may be modified as require; in some other embodiment, the coupling portion may be fixed to the covering portion by melting process.

Figure 11:
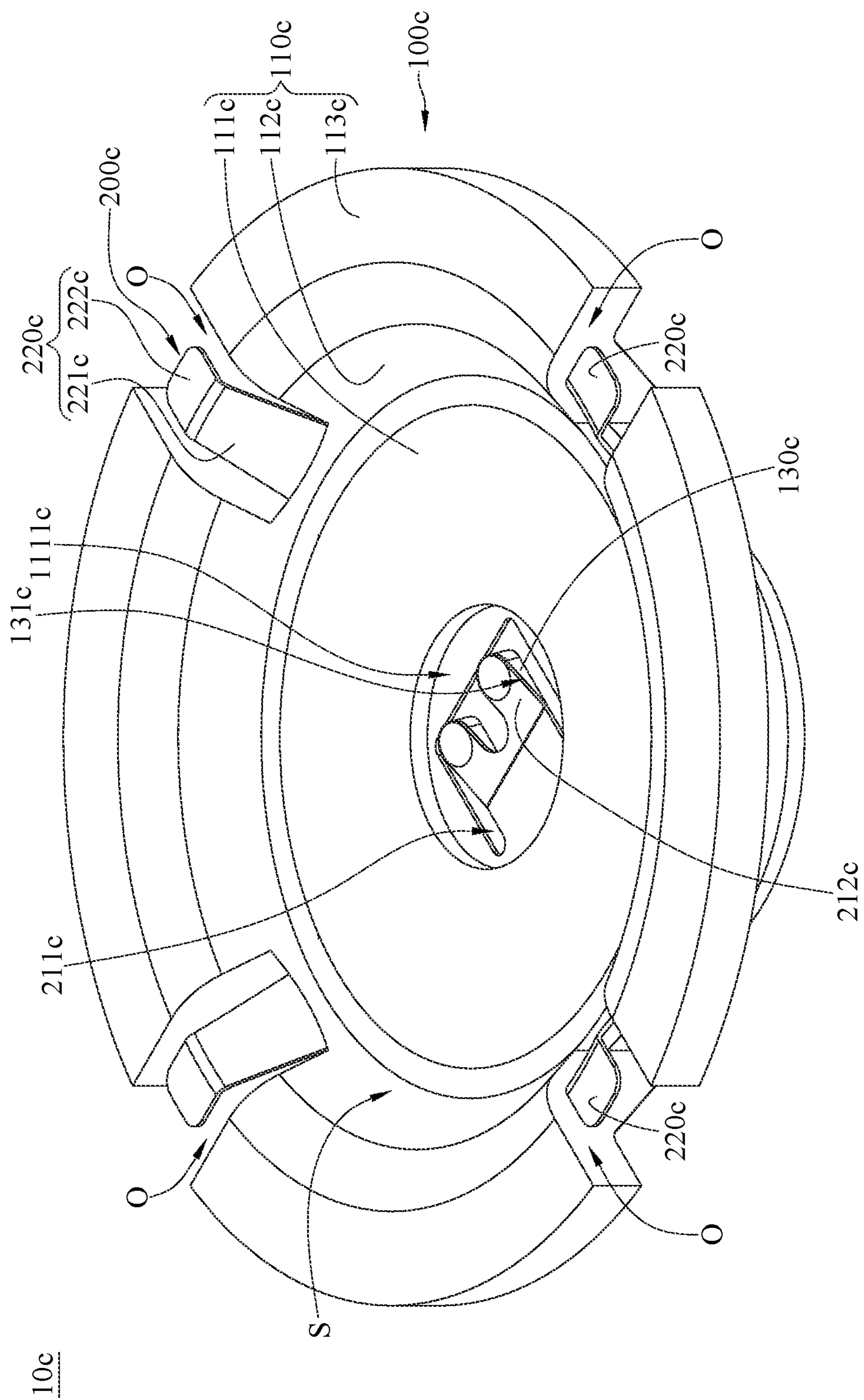
FIG. 11 is a perspective view of an activation assembly of a button according to a fourth embodiment of the disclosure.
Figure 12:
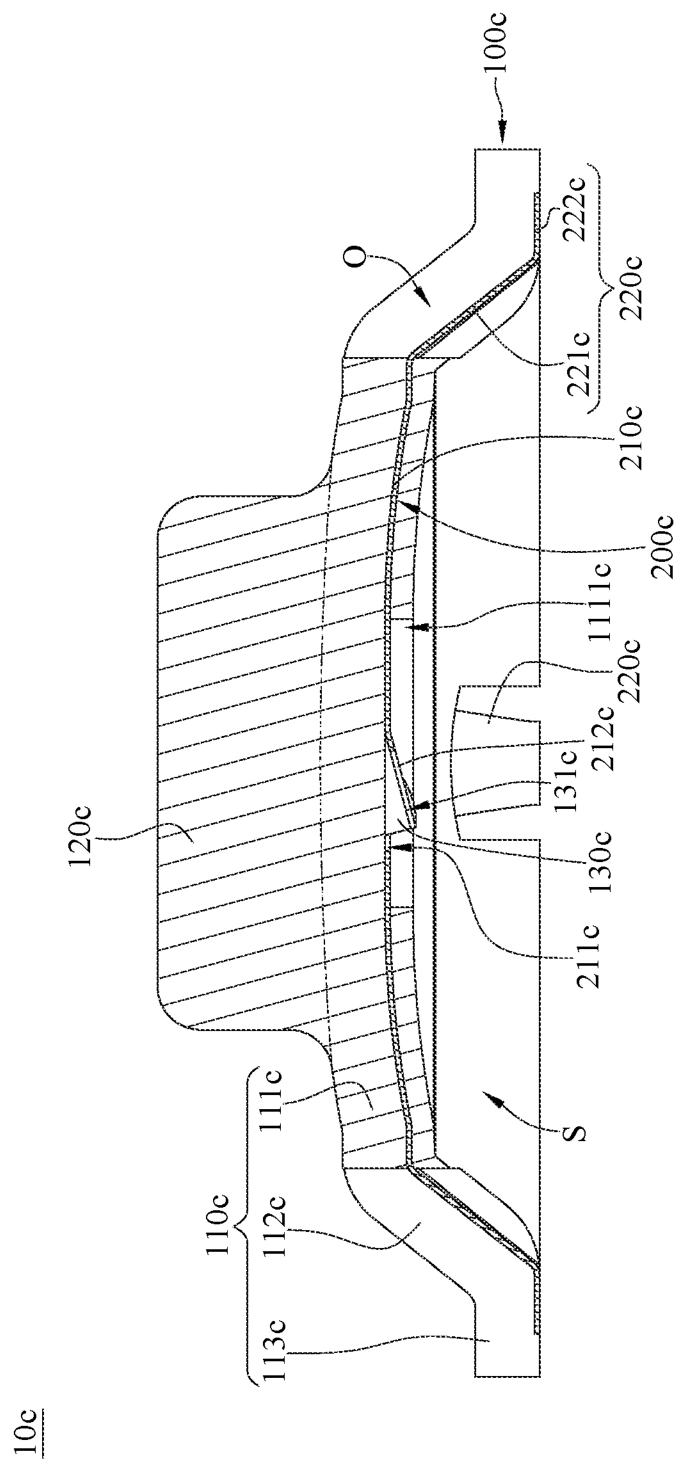
FIG. 12 is a cross-sectional view of the activation assembly of the button in FIG. 11.

Referring to FIGS. 11 and 12, there are shown a perspective view of an activation assembly 10_c_ of a button according to a fourth embodiment of the disclosure and a cross-sectional view of the activation assembly 10_c_ of the button in FIG. 11. In this embodiment, the activation assembly 10 of the button 1 shown in FIG. 1 is replaced with the activation assembly 10*c*, and the connection and operation of the activation assembly 10*c* relative to the support base 20, the substrate 30, the restoring component 40, and the keycap 50 are the same as that of the activation assembly 10 relative to the support base 20, the substrate 30, the restoring component 40, and the keycap 50, thus the same part between them will not be repeatedly introduced. The following paragraphs mainly introduce the activation assembly 10*c* in detail.

In this embodiment, the activation assembly 10*c* includes a flexible guiding component 100*c* and an elastic component 200*c*.

The flexible guiding component 100*c* includes a covering portion 110*c*, a first contact portion 120*c*, and a second contact portion 130*c*. The covering portion 110*c* has a cavity S and a plurality of openings O connected to the cavity S. The covering portion 110*c* is fixed to the substrate 30 (as shown in FIG. 1). The first contact portion 120*c* and the second contact portion 130*c* are respectively arranged on two opposite sides of the covering portion 110*c*. Specifically, the first contact portion 120*c* may be a protrusion protruding outwards from a surface of the covering portion 110*c* facing away from the cavity S, and the second contact portion 130*c* may be another protrusion located in the cavity S. The first contact portion 120*c* is configured to contact the keycap 50 (as shown in FIG. 1). When the keycap 50 pushes the first contact portion 120*c*, the second contact portion 130*c* is forced to touch the circuit of the substrate 30. In more detail, the covering portion 110*c* includes a first covering part 111*c*, a plurality of second covering parts 112*c*, and a plurality of coupling parts 113*c*. The first covering part 111*c* has a hole 1111*c*. The second covering parts 112*c* are connected to the first covering part 111*c*, and the second covering parts 112*c* are spaced apart from one another. Each of the openings O is formed between adjacent two of the second covering parts 112*c*. The coupling parts 113*c* are respectively connected to the second covering parts 112*c*. The coupling parts 113*c* are connected to the first covering part 111*c* via the second covering parts 112*c*. The flexible guiding component 100*c* is fixed to the substrate 30 via the coupling parts 113*c*. The coupling parts 113*c* are fixed to the substrate 30 via, for example, adhesive or any suitable means. The second contact portion 130*c* has an inclined surface 131*c* located at a side of the second contact portion 130*c* away from the first covering part 111*c*.

In this embodiment, a thickness of the first covering part 111*c* is substantially the same as a thickness of each second covering part 112*c* to improve the tactile feedback. The first covering part 111*c* and the second covering parts 112*c* may have a thickness ranging from 0.2 millimeters to 0.5 millimeters. In one embodiment, the thickness of the first covering part 111*c* and the second covering parts 112*c* may be 0.3 millimeters. Note that the first covering part and the second covering parts may be different in thickness.

The flexible guiding component 100*c* may be made of rubber, but the present disclosure is not limited thereto; in some other embodiment, the flexible guiding component 100*c* may be made of Mylar or polyethylene terephthalate (i.e., PET). Compared to the flexible guiding component made of Mylar or PET, the flexible guiding component made of rubber has a longer lifespan and produce less noise when using.

The elastic component 200*c* may be made of any suitable metal, such as metal. The elastic component 200*c* includes a coupling portion 210*c* and a plurality of support portions 220*c*. The coupling portion 210*c* of the elastic component 200*c* is coupled with the first covering part 111*c* of the covering portion 110*c* via insert molding process. The support portions 220*c* extend outwards from the coupling portion 210*c* and are respectively located at the openings O, such that the support portions 220*c* are movable within openings O without being interfered by the flexible guiding component 100*c*.

The coupling portion 210*c* of the elastic component 200*c* has a hole 211*c* and a pressing part 212*c*. The second contact portion 130*c* is located at the hole 211*c*, and the pressing part 212*c* is attached on the inclined surface 131*c*. The pressing part 212*c* and the second contact portion 130*c* are exposed from the hole 1111*c* of the first covering part 111*c*. The pressing part 212*c* and the second contact portion 130*c* are configured to touch the substrate 30.

Each of the support portions 220*c* includes an inclined part 221*c* and a contact part 222*c*, where the contact part 222*c* is flat and is connected to the coupling portion 210*c* via the inclined part 221*c*. When the elastic component 200*c* is not yet deformed by the keycap 50, the contact part 222*c* is in contact with the substrate 30 (as shown in FIG. 1) via a flat surface of the contact part 222*c*. This helps prevent the elastic component 200*c* from damaging the substrate 30 when using.

Figure 13:
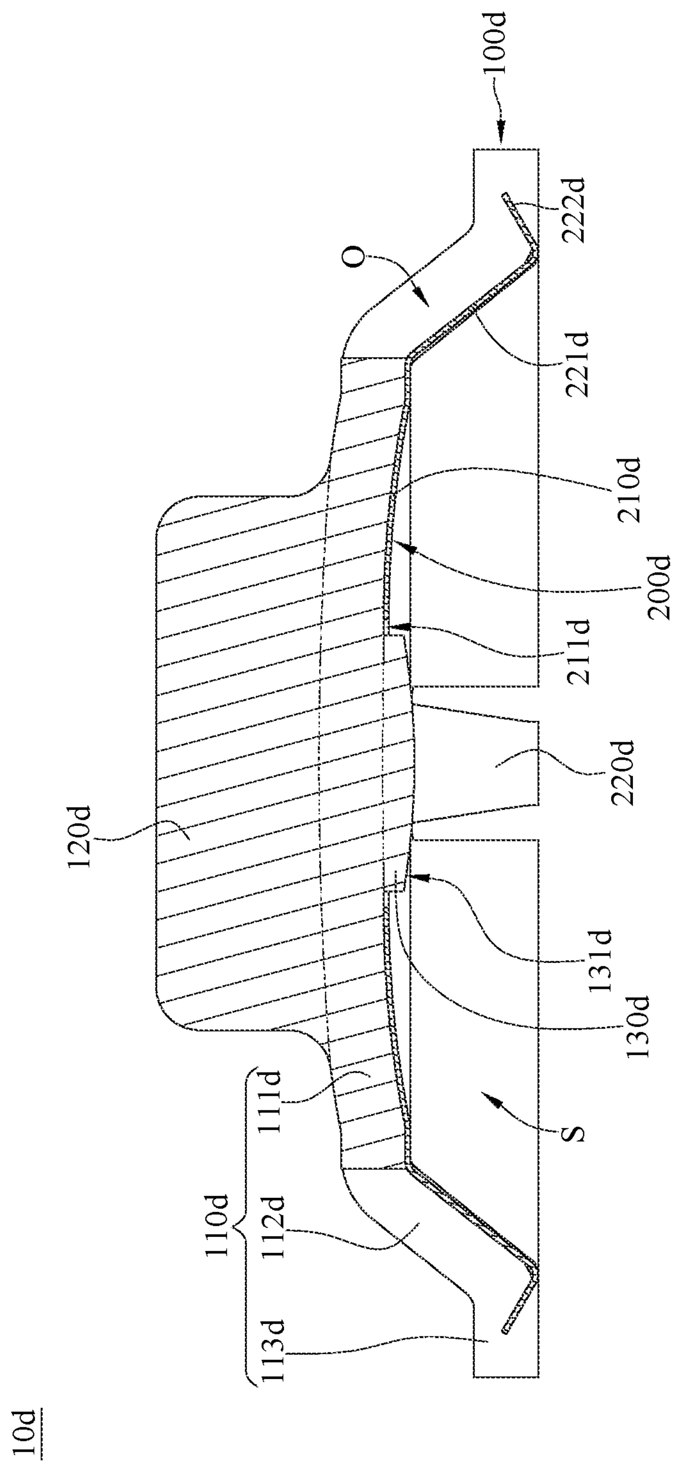
FIG. 13 is a cross-sectional view of an activation assembly of a button according to a fifth embodiment of the disclosure.

In the embodiment of the FIG. 1, the elastic component 200 of the button includes the inclined part 221 and a contact part 222, but the present disclosure is not limited thereto. Referring to FIG. 13, there is shown a cross-sectional view of an activation assembly of a button according to a fifth embodiment of the disclosure. In this embodiment, the activation assembly 10 of the button 1 shown in FIG. 1 is replaced with the activation assembly 10*d*, and the connection and operation of the activation assembly 10*d* relative to the support base 20, the substrate 30, the restoring component 40, and the keycap 50 are the same as that of the activation assembly 10 relative to the support base 20, the substrate 30, the restoring component 40, and the keycap 50, thus the same part between them will not be repeatedly introduced. The following paragraphs mainly introduce the activation assembly 10*d* in detail.

In this embodiment, the activation assembly 10*d* includes a flexible guiding component 100*d* and an elastic component 200*d*.

The flexible guiding component 100*d* includes a covering portion 110*d*, a first contact portion 120*d*, and a second contact portion 130*d*. The covering portion 110*d* has a cavity S and a plurality of openings O connected to the cavity S. The covering portion 110*d* is fixed to the substrate 30 (as shown in FIG. 1). The first contact portion 120*d* and the second contact portion 130*d* are respectively arranged on two opposite sides of the covering portion 110*d*. Specifically, the first contact portion 120*d* may be a protrusion protruding outwards from a surface of the covering portion 110*d* facing away from the cavity S, and the second contact portion 130*d* may be another protrusion located in the cavity S. The first contact portion 120*d* is configured to contact the keycap 50 (as shown in FIG. 1). When the keycap 50 pushes the first contact portion 120*d*, the second contact portion 130*d* is forced to touch the circuit of the substrate 30. In more detail, the covering portion 110*d* includes a first covering part 111*d*, a plurality of second covering parts 112*d*, and a plurality of coupling parts 113*d*. The second covering parts 112*d* are connected to the first covering part 111*d*, and the second covering parts 112*d* are spaced apart from one another. Each of the openings O is formed between adjacent two of the second covering parts 112*d*. The coupling parts 113*d* are respectively connected to the second covering parts 112*d*. The coupling parts 113*d* are connected to the first covering part 111*d* via the second covering parts 112*d*. The flexible guiding component 100*d* is fixed to the substrate 30 via the coupling parts 113*d*. The coupling parts 113*d* are fixed to the substrate 30, for example, via adhesive or any suitable means. The second contact portion 130*d* has a convex curved surface 131*d* located at a side of the second contact portion 130*d* away from the first covering part 111*d*. That is, the convex curved surface 131*d* protrudes towards a direction opposite to the first covering part 111*d*. The convex curved surface 131*d* is provided to make the force from the second contact portion 130*d* concentrated at the substrate 30, thereby making the touch of the second contact portion 130*d* much more effective.

Note that the convex curved surface 131*d* of the second contact portion 130*d* may be modified as required; in some other embodiments, the surface of the second contact portion that faces away from the first covering part may be a flat surface.

In this embodiment, a thickness of the first covering part 111*d* is substantially the same as a thickness of each second covering part 112*d* to improve the tactile feedback. The first covering part 111*d* and the second covering parts 112*d* may have a thickness ranging from 0.2 millimeters to 0.5 millimeters. In one embodiment, the thickness of the first covering part 111*d* and the second covering parts 112*d* may be 0.3 millimeters. Note that the first covering part and the second covering parts may be different in thickness.

The flexible guiding component 100*d* may be made of rubber, but the present disclosure is not limited thereto; in some other embodiment, the flexible guiding component 100*d* may be made of Mylar or polyethylene terephthalate (i.e., PET). Compared to the flexible guiding component made of Mylar or PET, the flexible guiding component made of rubber has a longer lifespan and produce less noise when using.

The elastic component 200*d* may be made of any suitable metal, such as metal. The elastic component 200*d* includes a coupling portion 210*d* and a plurality of support portions 220*d*. The coupling portion 210*d* of the elastic component 200*d* has a hole 211*d*.

The coupling portion 210*d* of the elastic component 200*d* is disposed on the first covering part 111*d* of the covering portion 110*d* via adhesive and located in the cavity S, and the second contact portion 130*d* of the flexible guiding component 100*d* is disposed through the hole 211*d*. The support portions 220*d* extend outwards from the coupling portion 210*d* and are respectively located at the openings O, such that the support portions 220*d* are movable within the openings O without being interfered by the flexible guiding component 100*d*.

The support portion 220*d* includes an inclined part 221*d* and a contact part 222*d*, where the contact part 222*d* is upturned and is connected to the coupling portion 210*d* via the inclined part 221*d*. There is a bent structure formed between the inclined part 221*d* and the contact part 222*d* of the support portion 220*d*, and the bent structure contacts the substrate 30. This helps prevent the elastic component 200*d* from damaging the substrate 30 when using.

Figure 14:
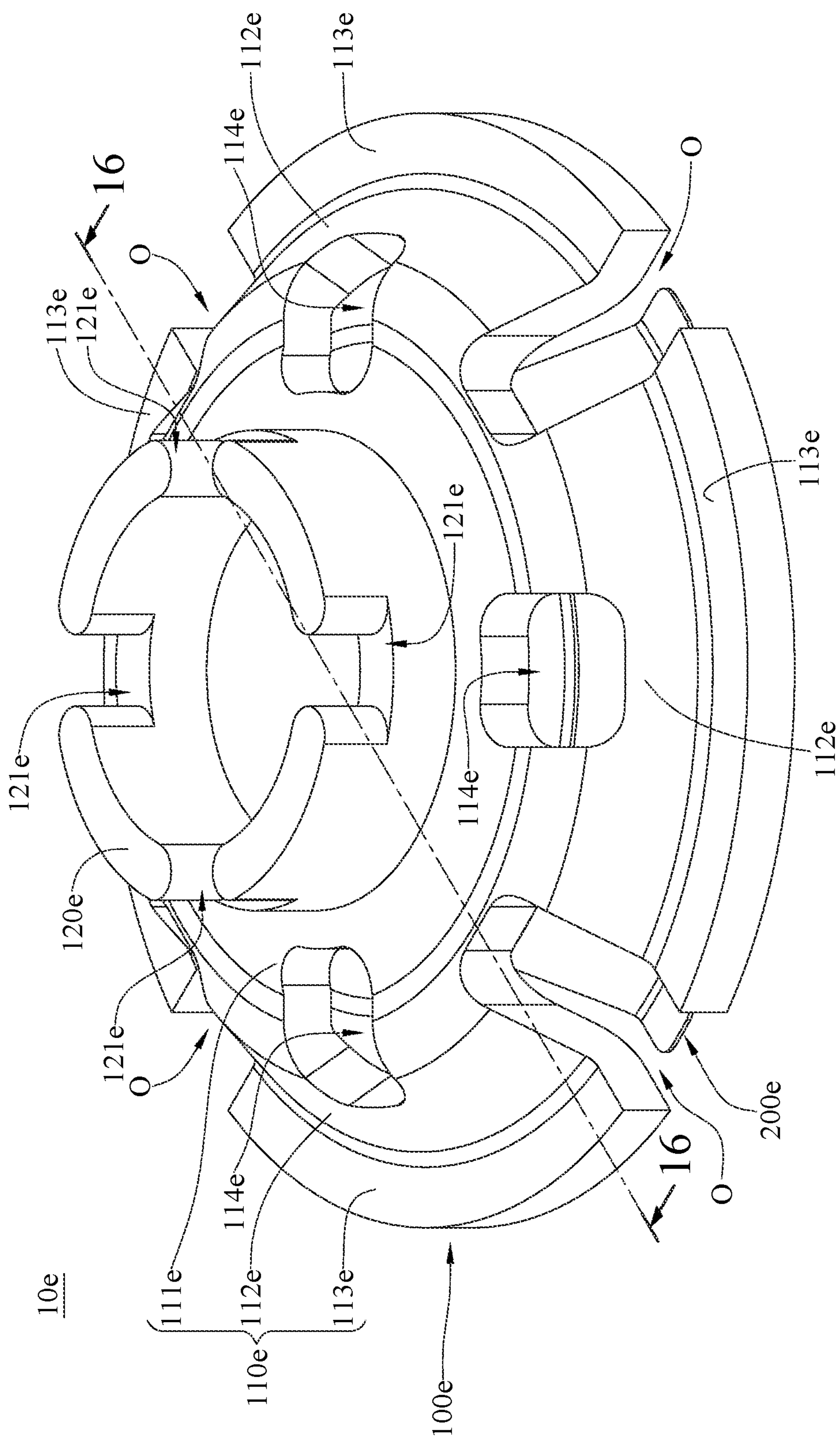
FIG. 14 is a perspective view of an activation assembly of a button according to a sixth embodiment of the disclosure.
Figure 15:
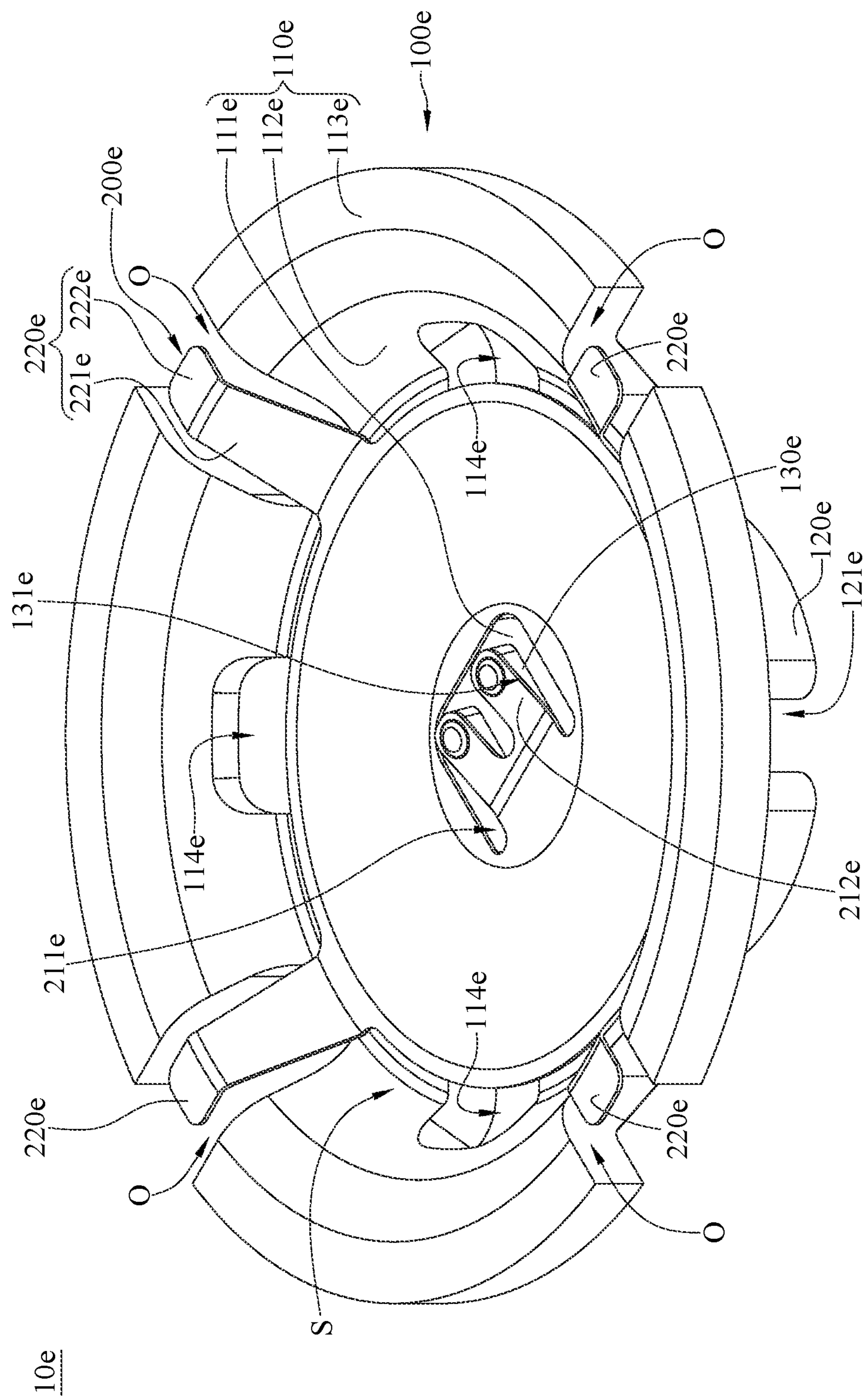
FIG. 15 is another perspective view of the activation assembly in FIG. 14.
Figure 16:
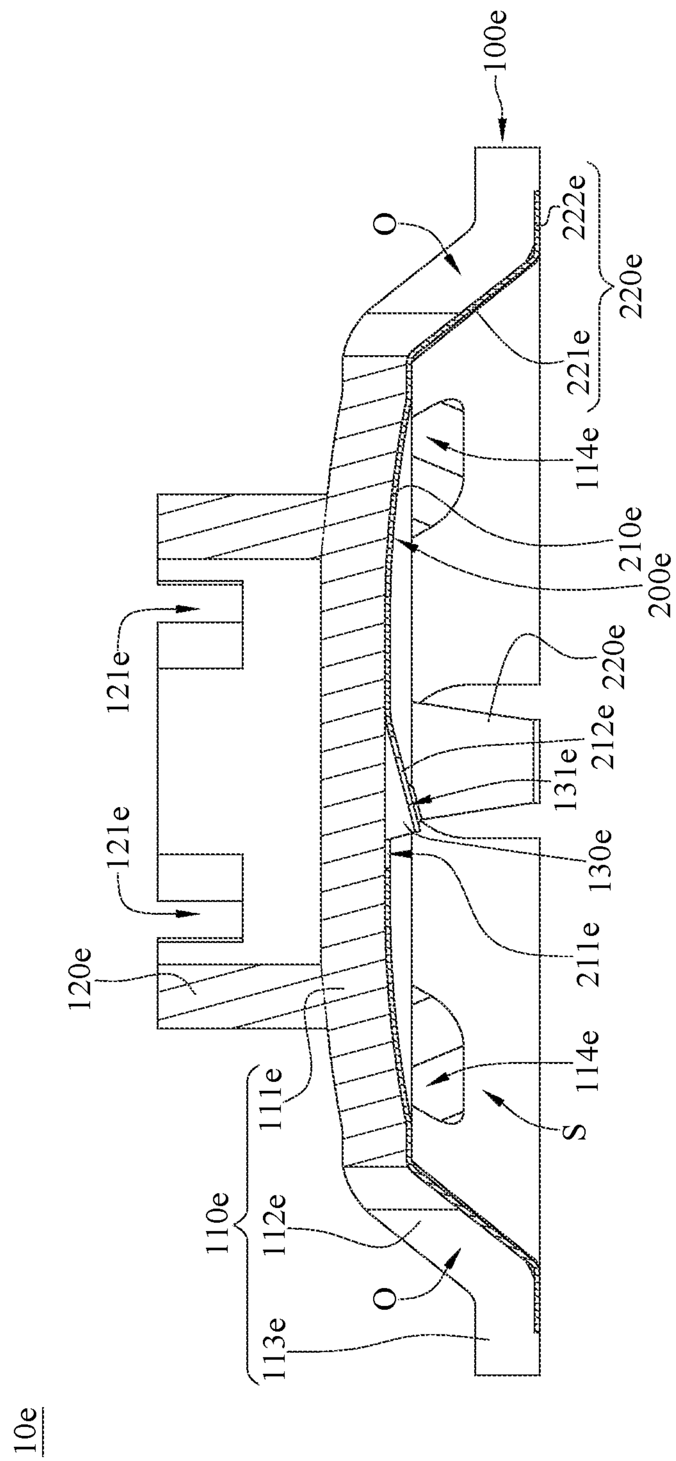
FIG. 16 is a cross-sectional view of the activation assembly in FIG. 14 taken along line 16-16.

Referring to FIGS. 14 to 16, there are shown a perspective view of an activation assembly 10*e* of a button according to a sixth embodiment of the disclosure, another perspective view of the activation assembly 10*e* in FIG. 14, and a cross-sectional view of the activation assembly 10*e* in FIG. 14 taken along line 16-16. In this embodiment, the activation assembly 10 of the button 1 shown in FIG. 1 is replaced with the activation assembly 10*e*, and the connection and operation of the activation assembly 10*e* relative to the support base 20, the substrate 30, the restoring component 40, and the keycap 50 are the same as that of the activation assembly 10 relative to the support base 20, the substrate 30, the restoring component 40, and the keycap 50, thus the same part between them will not be repeatedly introduced. The following paragraphs mainly introduce the activation assembly 10*e* in detail.

In this embodiment, the activation assembly 10*e* includes a flexible guiding component 100*e* and an elastic component 200*e*.

The flexible guiding component 100*e* includes a covering portion 110*e*, a first contact portion 120*e*, and a second contact portion 130*e*. The covering portion 110*e* has a cavity S and a plurality of openings O connected to the cavity S. The covering portion 110*e* is fixed to the substrate 30 (as shown in FIG. 1). The first contact portion 120*e* and the second contact portion 130*e* are respectively arranged on two opposite sides of the covering portion 110*e*. Specifically, the first contact portion 120*e* may be a protrusion protruding from a surface of the covering portion 110*e* facing away from the cavity S, and the second contact portion 130*e* may be another protrusion in the cavity S. The first contact portion 120*e* is configured to contact the keycap 50 (as shown in FIG. 1). When the keycap 50 pushes the first contact portion 120*e*, the second contact portion 130*e* is forced to touch the circuit of the substrate 30. In more detail, the covering portion 110*e* includes a first covering part 111*e*, a plurality of second covering parts 112*e*, and a plurality of coupling parts 113*e*. The second covering parts 112*e* are connected to the first covering part 111*e*, and the second covering parts 112*e* are spaced apart from one another. Each of the openings O is formed between adjacent two of the second covering parts 112*e*. The coupling parts 113*e* are respectively connected to the second covering parts 112*e*. The coupling parts 113*e* are connected to the first covering part 111*e* via the second covering parts 112*e*. The flexible guiding component 100*e* is fixed to the substrate 30 via the coupling parts 113*e*. The coupling parts 113*e* are fixed to the substrate 30 via, for example, adhesive or any suitable means. The second contact portion 130*e* has an inclined surface 131*e* located at a side of the second contact portion 130*e* away from the first covering part 111*e*.

In this embodiment, the covering portion 110*e* has a plurality of holes 114*e* on the first covering part 111*e* and the second covering parts 112*e*, and the first contact portion 120*e* may have a plurality of holes 121*e*. The holes 114*e* may be through holes, and the holes 121*e* may be recesses. The arrangements of the holes 114*e* on the first covering part 111*e* and the second covering parts 112*e* and the holes 121*e* on the first contact portion 120*e* help decrease the stiffness of the flexible guiding component 100*e*, giving the activation assembly 10*e* a required tactile feedback. Note the arrangements, numbers, shape, and sizes of the holes 114*e* and the holes 121*e* relate to how the activation assembly 10*e* is going to respond to the push of the keycap 50. For example, the more quantity or larger sizes of the holes 114*e* and 121*e*, the smaller force that is required to deform the activation assembly 10*e*. In other words, the tactile feedback of the activation assembly 10*e* may be adjusted by modifying the arrangement of the holes on the covering portion 110 and the first contact portion 120*e*.

In this embodiment, a thickness of the first covering part 111*e* is substantially the same as a thickness of each second covering part 112*e* to improve the tactile feedback. The first covering part 111*e* and the second covering parts 112*e* may have a thickness ranging from 0.2 millimeters to 0.5 millimeters. In one embodiment, the thickness of the first covering part 111*e* and the second covering parts 112*e* may be 0.3 millimeters. Note that the first covering part and the second covering parts may be different in thickness.

The flexible guiding component 100*e* may be made of rubber, but the present disclosure is not limited thereto; in some other embodiment, the flexible guiding component 100*e* may be made of Mylar or polyethylene terephthalate (i.e., PET). Compared to the flexible guiding component made of Mylar and PET, the flexible guiding component made of rubber has a longer lifespan and produce less noise when using.

The elastic component 200*e* may be made of any suitable metal, such as metal. The elastic component 200*e* includes a coupling portion 210*e* and a plurality of support portions 220*e*. The coupling portion 210*e* of the elastic component 200*e* has a hole 211*e* and a pressing part 212*e* located at the hole 211*e*.

The coupling portion 210*e* is disposed on the covering portion 110*e* and located in the cavity S. The coupling portion 210*e* may be simply placed on the covering portion 110*e*, or the coupling portion 210*e* may be fixed to the covering portion 110*e* via adhesive. The second contact portion 130*e* of the flexible guiding component 100*e* is disposed through the hole 211*e*, and the pressing part 212*e* is attached on the inclined surface 131*e* and is configured to contact the substrate 30. The support portions 220*e* extend outwards from the coupling portion 210*e* and are respectively located at the openings O, such that the support portions 220*e* are movable within the openings O without being interfered by the flexible guiding component 100*e*.

Each of the support portions 220*e* includes an inclined part 221*e* and a contact part 222*e*, where the contact part 222*e* is flat and is connected to the coupling portion 210*e* via the inclined part 221*e*. When the elastic component 200*e* is not yet deformed by the keycap 50, the contact part 222*e* is in contact with the substrate 30 (as shown in FIG. 1) via a flat surface of the contact part 222*e*. This helps prevent the elastic component 200*e* from damaging the substrate 30 when using.

Note that the manner used to dispose the coupling portion 210*e* on the covering portion 110*e* may be modified as require; in some other embodiment, the coupling portion may be fixed to the covering portion by melting process.

Figure 17:
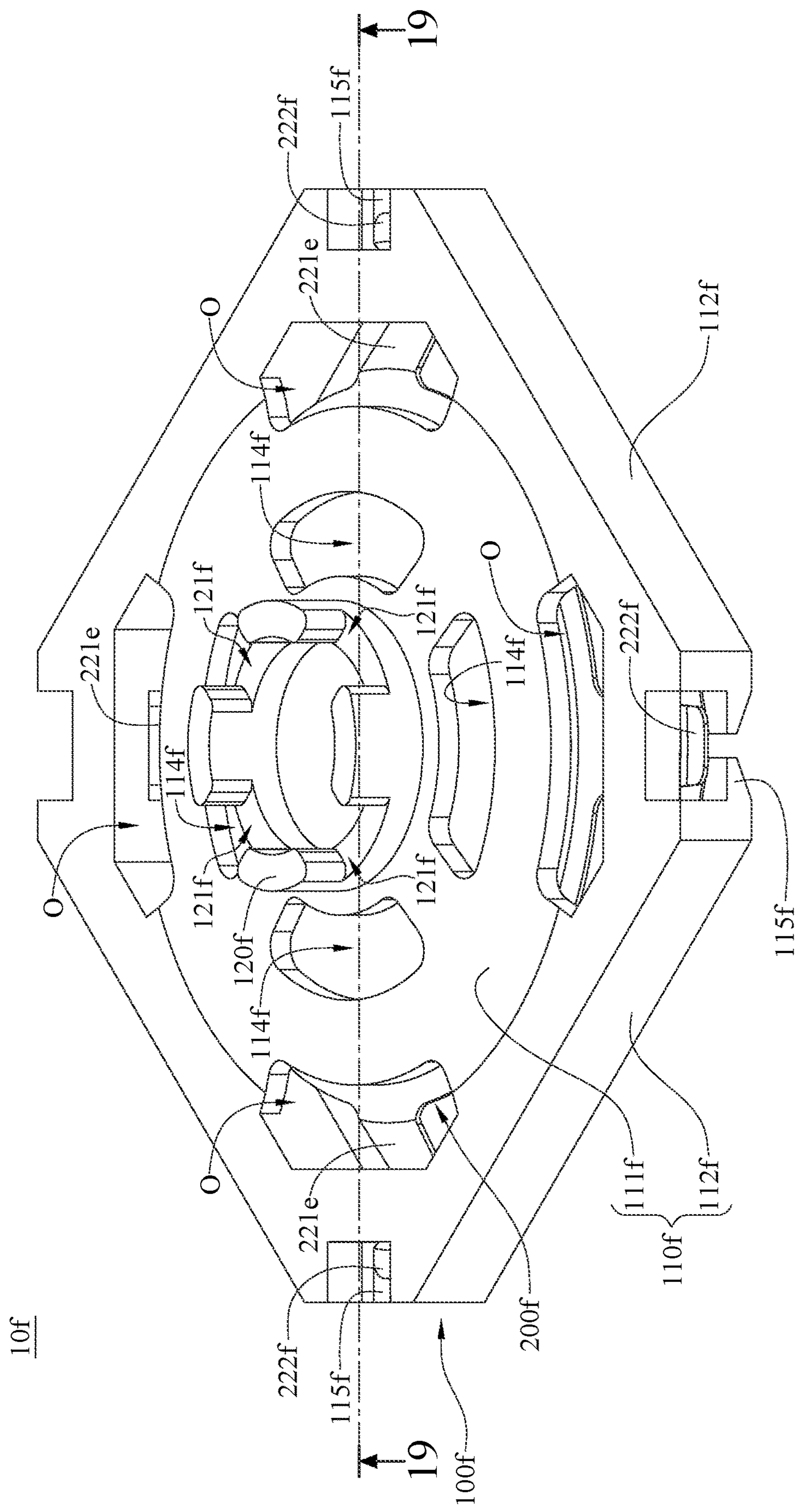
FIG. 17 is a perspective view of an activation assembly of a button according to a seventh embodiment of the disclosure.
Figure 18:
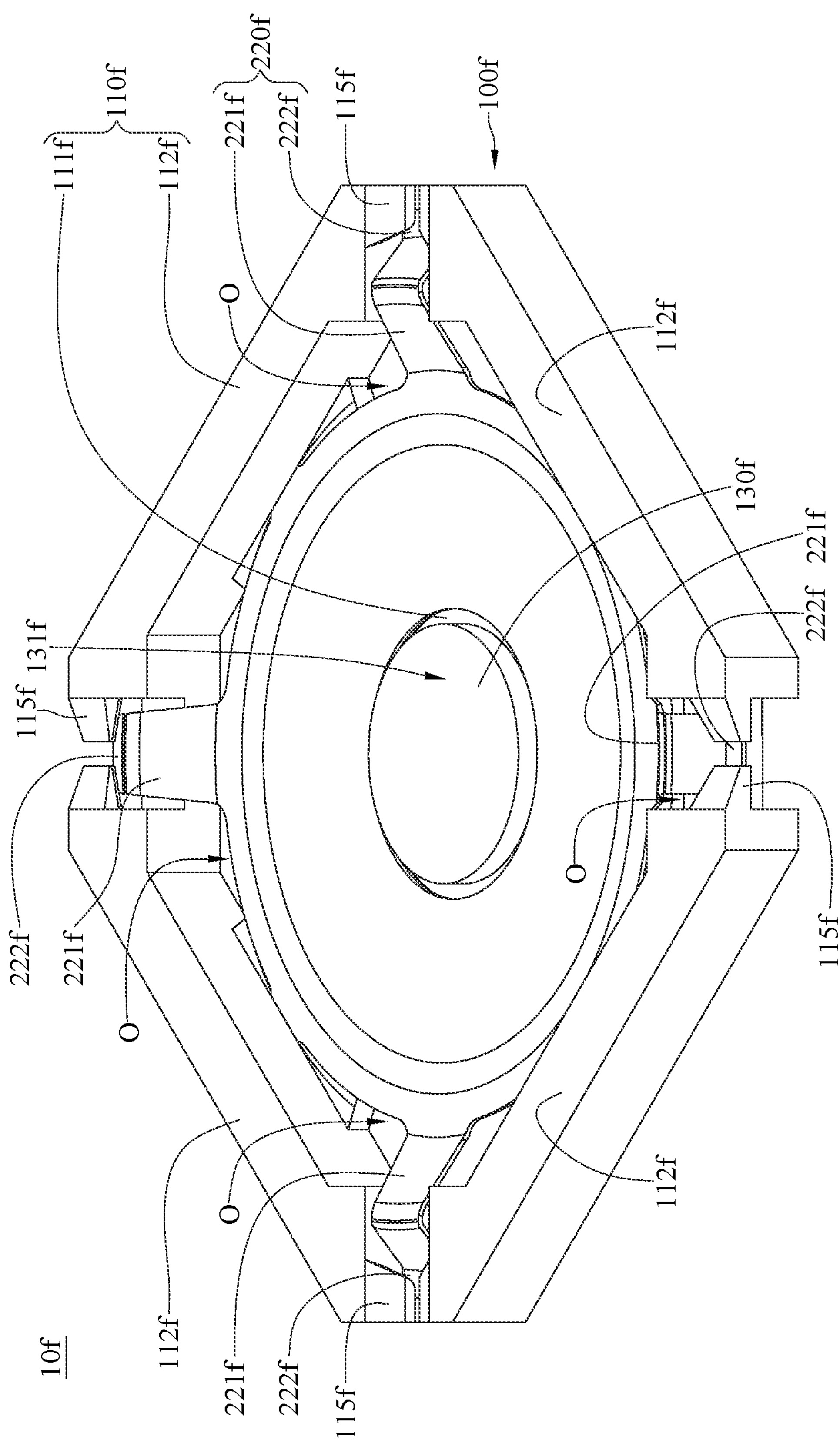
FIG. 18 is another perspective view of the activation assembly in FIG. 17.
Figure 19:
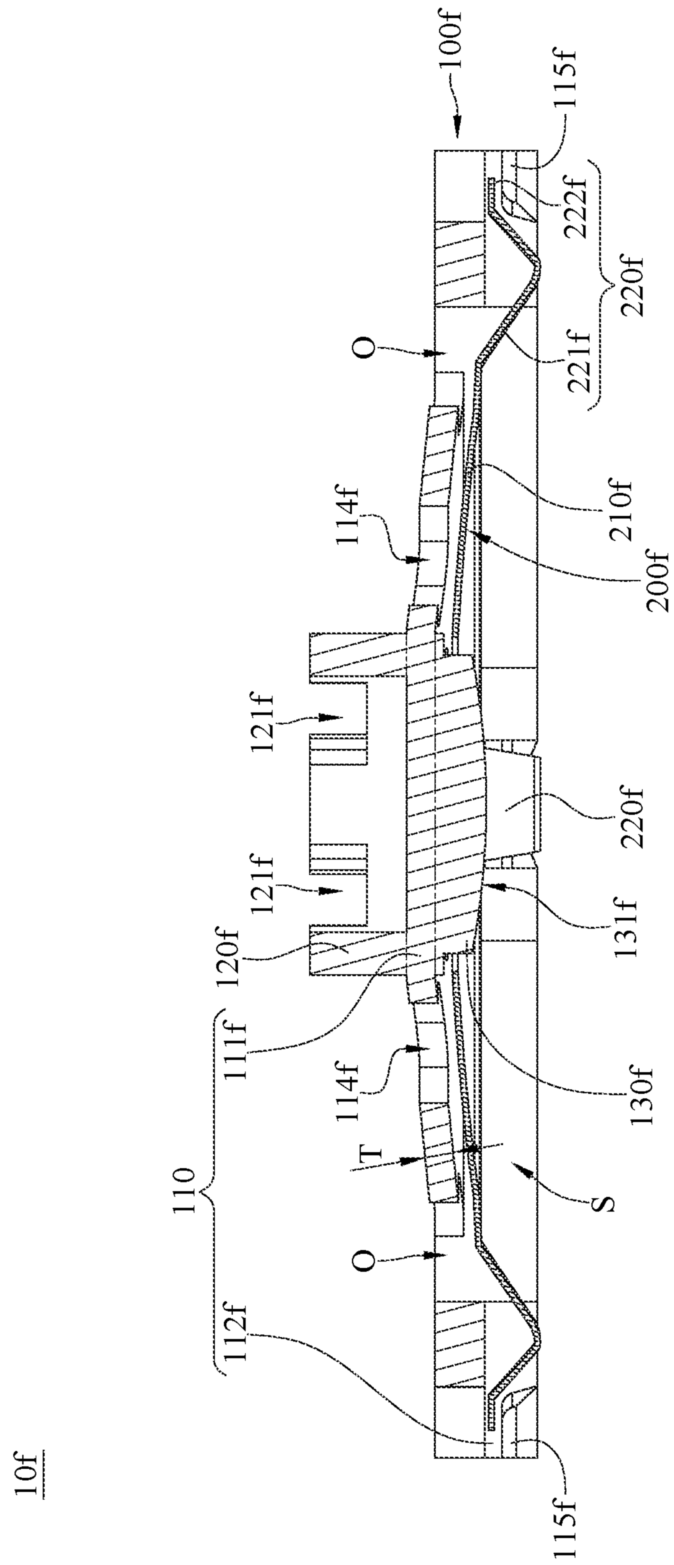
FIG. 19 is a cross-sectional view of the activation assembly in FIG. 17 taken along line 19-19.

Referring to FIGS. 17 to 19, there are shown a perspective view of an activation assembly 10*f* of a button according to a seventh embodiment of the disclosure, another perspective view of the activation assembly 10*f* in FIG. 17, and a cross-sectional view of the activation assembly 10*f* in FIG. 17 taken along line 19-19. In this embodiment, the activation assembly 10 of the button 1 shown in FIG. 1 is replaced with the activation assembly 10*f*, and the connection and operation of the activation assembly 10*f* relative to the support base 20, the substrate 30, the restoring component 40, and the keycap 50 are the same as that of the activation assembly 10 relative to the support base 20, the substrate 30, the restoring component 40, and the keycap 50, thus the same part between them will not be repeatedly introduced. The following paragraphs mainly introduce the activation assembly 10*f* in detail.

In this embodiment, the activation assembly 10*f* includes a flexible guiding component 100*f* and an elastic component 200*f*.

The flexible guiding component 100*f* includes a covering portion 110*f*, a first contact portion 120*f*, and a second contact portion 130*f*. The covering portion 110*f* has a cavity S and a plurality of openings O connected to the cavity S. The covering portion 110*f* is fixed to the substrate 30 (as shown in FIG. 1). The first contact portion 120*f* and the second contact portion 130*f* are respectively arranged on two opposite sides of the covering portion 110*f*. Specifically, the first contact portion 120*f* may be a protrusion protruding from a surface of the covering portion 110*f* facing away from the cavity S, and the second contact portion 130*f* may be another protrusion located in the cavity S. The first contact portion 120*f* is configured to contact the keycap 50 (as shown in FIG. 1). When the keycap 50 pushes the first contact portion 120*f*, the second contact portion 130*f* is forced to touch the circuit of the substrate 30. In more detail, the covering portion 110*f* includes a first covering part 111*f* and a plurality of second covering parts 112*f*. The first covering part 111*f* is, for example, in a square shape. The second covering parts 112*f* are connected to the first covering part 111*f*, and the second covering parts 112*f* are spaced apart from one another. Each of the openings O is formed between adjacent two of the second covering parts 112*f*. The second covering parts 112*f* are fixed to the substrate 30 via, for example, adhesive or any suitable means. The second contact portion 130*f* has a convex curved surface 131*f* (as shown in FIG. 19) located at a side of the second contact portion 130*f* away from the first covering part 111*f*. That is, the convex curved surface 131*f* protrudes towards a direction opposite to the first covering part 111*f*. The convex curved surface 131*f* is provided to make the force from the second contact portion 130*f* concentrated at the substrate 30, thereby making the touch of the second contact portion 130*f* much more effective.

Note that the convex curved surface 131*f* of the second contact portion 130*f* may be modified as required; in some other embodiments, the surface of the second contact portion that faces away from the first covering part may be a flat surface.

In this embodiment, the first covering part 111*f* of the covering portion 110*f* have a plurality of holes 114*f*, and the first contact portion 120*f* has a plurality of holes 121*f*. The holes 114*f* are, for example, through holes, and the holes 121*f* are, for example, recesses. The arrangements of the holes 114*f* of the first covering part 111*f* and the holes 121*f* of the first contact portion 120*f* help decrease the stiffness of the flexible guiding component 100*f*, giving the activation assembly 10*f* a required tactile feedback. Note the arrangements, numbers, shape, and sizes of the holes 114*f* and the holes 121*f* relate to how the activation assembly 10*f* is going to respond to the push of the keycap 50. For example, the more quantity or larger sizes of the holes 114*f* and 121*f* are, the smaller force that is required to deform the activation assembly 10*f* is. In other words, the tactile feedback of the activation assembly 10*f* may be adjusted by modifying the arrangement of the holes 114*f* and 121*f*.

As shown in FIG. 19, in this embodiment, the portion of which the first covering part 111*f* is connected to the first contact portion 120*f* and the second covering part 112*f* has a uniform thickness T to improve the tactile feedback. The first covering part 111*f* may have a thickness ranging from 0.2 millimeters to 0.5 millimeters. In one embodiment, the thickness T of the first covering part 111*f* may be 0.3 millimeters. Note that the thickness of the portion of which the first covering part is connected to the first contact portion and the second covering part may be non-uniform in some other embodiments.

The flexible guiding component 100*f* may be made of rubber, but the present disclosure is not limited thereto; in some other embodiment, the flexible guiding component 100*f* may be made of Mylar or polyethylene terephthalate (i.e., PET). Compared to the flexible guiding component made of Mylar and PET, the flexible guiding component made of rubber has a longer lifespan and produce less noise when using.

The elastic component 200*f* may be made of any suitable metal, such as metal. The elastic component 200*f* includes a coupling portion 210*f* and a plurality of support portions 220*f*. The coupling portion 210*f* of the elastic component 200*f* has a hole 211*f*. The coupling portion 210*f* is disposed on the first covering part 111*f* of the covering portion 110*f* and located in the cavity S. The coupling portion 210*f* may be simply placed on the covering portion 110*f*, or the coupling portion 210*f* may be fixed to the covering portion 110*f* via adhesive. The second contact portion 130*f* of the flexible guiding component 100*f* is disposed through the hole 211*f*. The support portions 220*f* extend outwards from the coupling portion 210*f* and are respectively located at the openings O, such that the support portions 220*f* are movable within the openings O without being interfered by the flexible guiding component 100*f*.

Each of the support portions 220*f* includes an inclined part 221*f* and a contact part 222*f*, where the contact part 222*f* is upturned and is connected to the coupling portion 210*f* via the inclined part 221*f*. There is a bent structure formed between the inclined part 221*f* and the contact part 222*f* of the support portion 220*f*, and the bent structure contacts the substrate 30. This helps prevent the elastic component 200*f* from damaging the substrate 30 when using.

Since the activation assembly 10*f* has a low height, the flexible guiding component 100*f* may further include a plurality of holding structures 115*f*. The holding structures 115*f* are connected to the second covering parts 112*f* and respectively and partially cover the openings O. As shown, the holding structures 115*f* are able to hold the support portions 220*f* of the elastic component 200*f* in the openings O so as to prevent the support portions 220*f* from coming out of the openings O. In addition, the support portions 220*f* are spaced apart from the second covering parts 112*f* so as to prevent the flexible guiding component 100*f* from interfering with the support portions 220*f*. Furthermore, the coupling portion 210*f* is firmly held in position by the second covering parts 112*f* of the flexible guiding component 100*f* during operation.

Note that the manner used to dispose the coupling portion 210*f* on the covering portion 110*f* may be modified as require; in some other embodiment, the coupling portion may be fixed to the covering portion by melting process.

In this embodiment, the coupling portion 210*f* of the elastic component 200*f* has a circular shape, but the present disclosure is not limited thereto; in some other embodiments, the coupling portion of the elastic component may have a square shape. In addition, the elastic component 200*f* have four support portions 220*f*, but the present disclosure is not limited thereto; in some other embodiments, the elastic component may have any number of the support portion.

Figure 20:
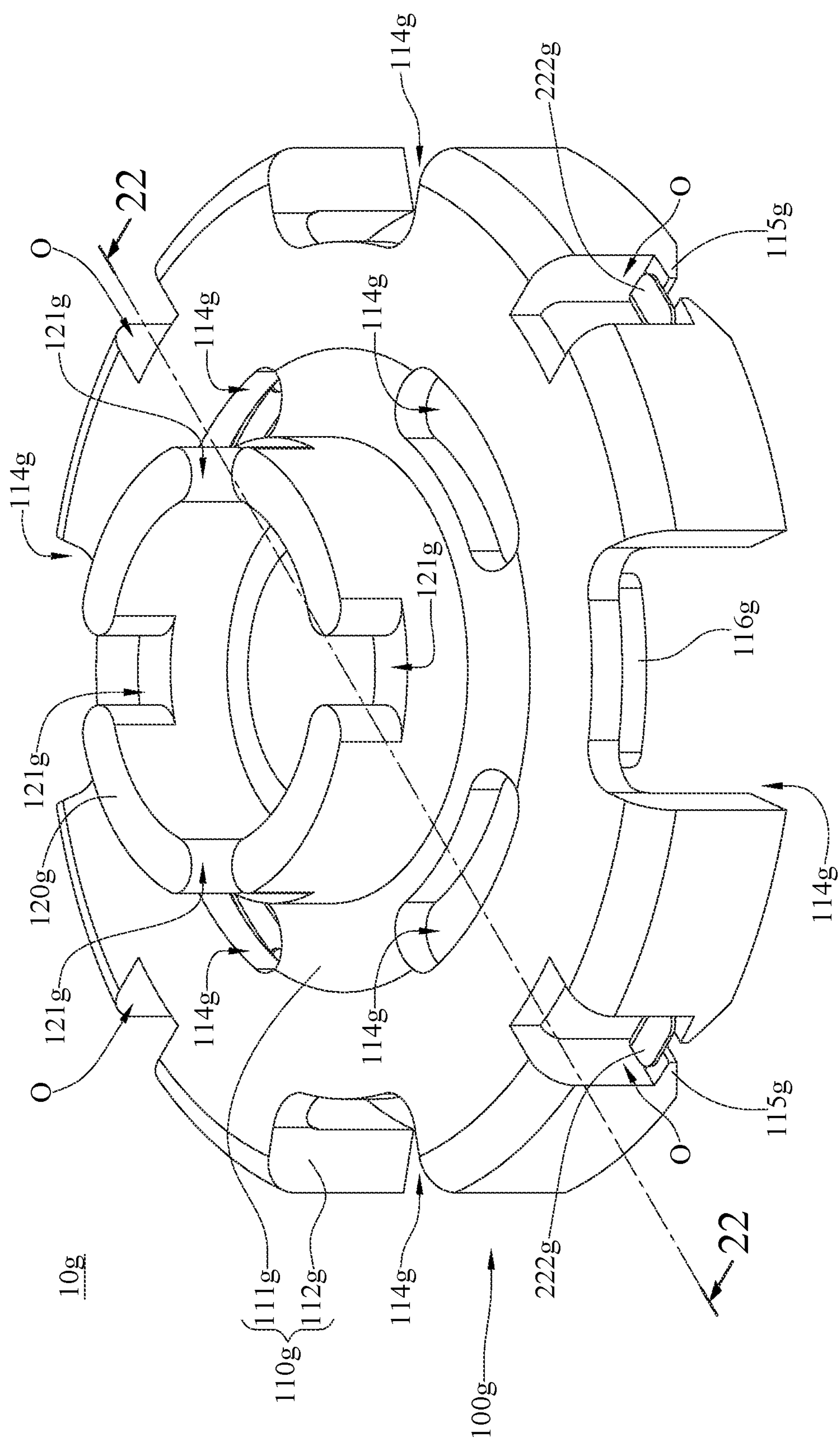
FIG. 20 is a perspective view of an activation assembly of a button according to an eighth embodiment of the disclosure.
Figure 21:
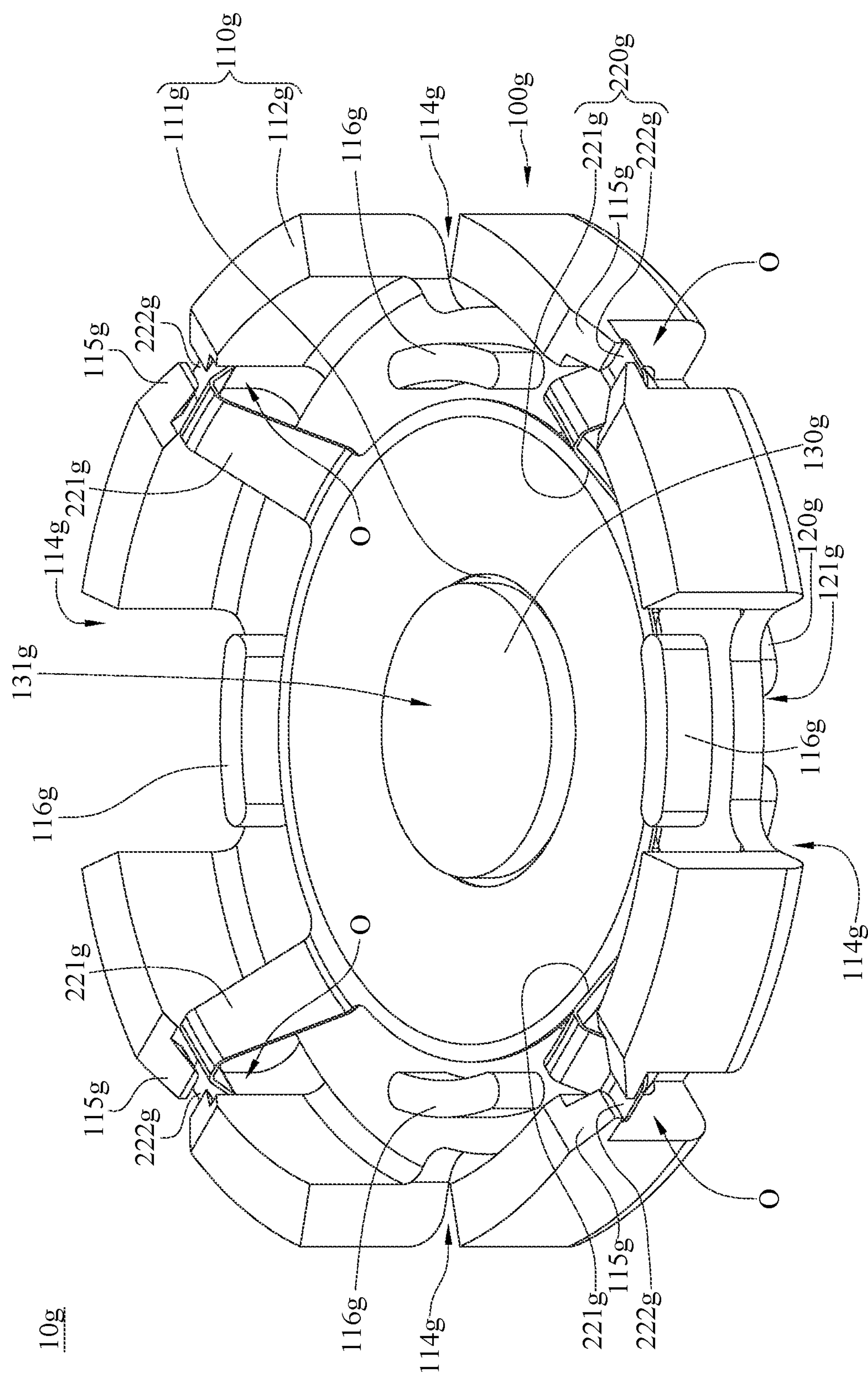
FIG. 21 is another perspective view of the activation assembly in FIG. 20.
Figure 22:
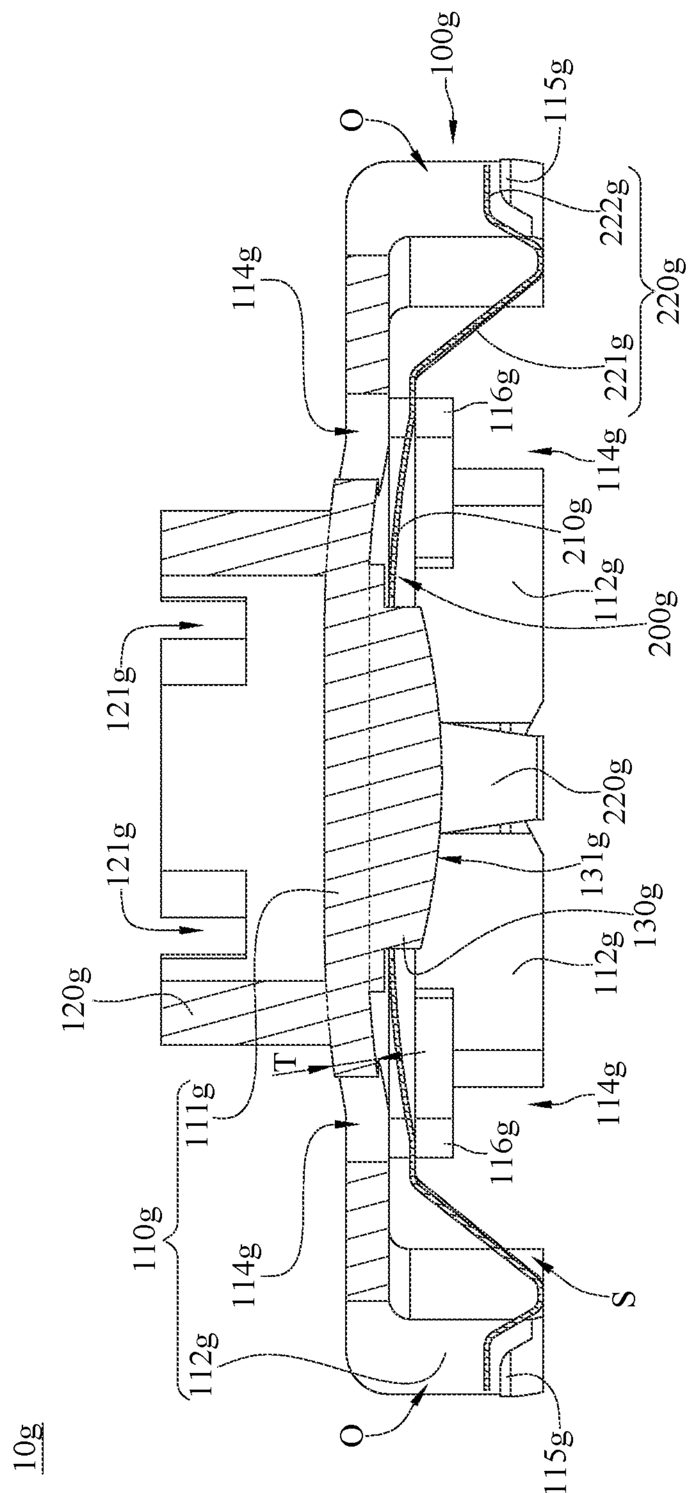
FIG. 22 is a cross-sectional view of the activation assembly in FIG. 20 taken along line 22-22.

Referring to FIGS. 20 to 22, there are shown a perspective view of an activation assembly 10*g* of a button according to an eighth embodiment of the disclosure, another perspective view of the activation assembly 10*g* in FIG. 20, and a cross-sectional view of the activation assembly 10*g* in FIG. 20 taken along line 22-22. In this embodiment, the activation assembly 10 of the button 1 shown in FIG. 1 is replaced with the activation assembly 10*g*, and the connection and operation of the activation assembly 10*g* relative to the support base 20, the substrate 30, the restoring component 40, and the keycap 50 are the same as that of the activation assembly 10 relative to the support base 20, the substrate 30, the restoring component 40, and the keycap 50, thus the same part between them will not be repeatedly introduced. The following paragraphs mainly introduce the activation assembly 10*g* in detail.

In this embodiment, the activation assembly 10*g* includes a flexible guiding component 100*g* and an elastic component 200*g*.

The flexible guiding component 100*g* includes a covering portion 110*g*, a first contact portion 120*g*, and a second contact portion 130*g*. The covering portion 110*g* has a cavity S and a plurality of openings O connected to the cavity S. The covering portion 110*g* is fixed to the substrate 30 (as shown in FIG. 1). The first contact portion 120*g* and the second contact portion 130*g* are respectively arranged on two opposite sides of the covering portion 110*g*. Specifically, the first contact portion 120*g* may be a protrusion protruding from a surface of the covering portion 110*g* facing away from the cavity S, and the second contact portion 130*g* may be another protrusion located in the cavity S. The first contact portion 120*g* is configured to contact the keycap 50. When the keycap 50 pushes the first contact portion 120*g*, the second contact portion 130*g* is forced to touch the circuit of the substrate 30. In more detail, the covering portion 110*g* may further include a first covering part 111*g* and a plurality of second covering parts 112*g*. The first covering part 111*g* is, for example, in a circular shape. The second covering parts 112*g* are connected to the first covering part 111*g*, and the second covering parts 112*g* are spaced apart from one another. Each of the openings O is formed between adjacent two of the second covering parts 112*g*. The second covering parts 112*g* are fixed to the substrate 30 via, for example, adhesive or any suitable means. The second contact portion 130*g* has a convex curved surface 131*g* (as shown in FIG. 22) located at a side of the second contact portion 130*g* away from the first covering part 111*g*. That is, the convex curved surface 131*g* protrudes towards a direction opposite to the first covering part 111*g*. The convex curved surface 131*g* is provided to make the force from the second contact portion 130*g* concentrated at the substrate 30, thereby making the touch of the second contact portion 130*g* much more effective.

Note that the convex curved surface 131*g* of the second contact portion 130*g* may be modified as required; in some other embodiments, the surface of the second contact portion that faces away from the first covering part may be a flat surface.

In this embodiment, the covering portion 110*g* have a plurality of holes 114*g* on the first covering part 111*g* and the second covering parts 112*g*, and the first contact portion 120*g* has a plurality of holes 121*g*. The holes 114*g* are, for example, through holes, and the holes 121*g* are, for example, recesses. The arrangements of the holes 114*g* of the covering portion 110*g* and the holes 121*g* of the first contact portion 120*g* help decrease the stiffness of the flexible guiding component 100*g*, giving the activation assembly 10*g* a required tactile feedback. Note the arrangements, numbers, shape, and sizes of the holes 114*g* and the holes 121*g* relate to how the activation assembly 10*g* is going to respond to the push of the keycap 50. For example, the more quantity or larger sizes of the holes 114*g* and 121*g* are, the smaller force that is required to deform the activation assembly 10*g* is. In other words, the tactile feedback of the activation assembly 10*g* may be adjusted by modifying the arrangement of the holes 114*g* and 121*g*.

As shown in FIG. 22, in this embodiment, the portion of which the first covering part 111*g* is connected to the first contact portion 120*g* and the second covering part 112*g* has a uniform thickness to improve the tactile feedback. The first covering part 111*g* may have a thickness T ranging from 0.2 millimeters to 0.5 millimeters. In one embodiment, the thickness T of the first covering part 111*g* may be 0.3 millimeters. Note that the thickness of the portion of which the first covering part is connected to the first contact portion and the second covering part may be non-uniform in some other embodiments.

The flexible guiding component 100*g* may be made of rubber, but the present disclosure is not limited thereto; in some other embodiment, the flexible guiding component 100*g* may be made of Mylar or polyethylene terephthalate (i.e., PET). Compared to the flexible guiding component made of Mylar and PET, the flexible guiding component made of rubber has a longer lifespan and produce less noise when using.

The elastic component 200*g* may be made of any suitable metal, such as metal. The elastic component 200*g* includes a coupling portion 210*g* and a plurality of support portions 220*g*. The coupling portion 210*g* of the elastic component 200*g* has a hole 211*g*. The coupling portion 210*g* is disposed on the first covering part 111*g* of the covering portion 110*g* and located in the cavity S. The coupling portion 210*g* may be simply placed on the covering portion 110*g*, or the coupling portion 210*g* may be fixed to the covering portion 110*g* via adhesive. The second contact portion 130*g* of the flexible guiding component 100*g* is disposed through the hole 211*g*. The support portions 220*g* extend outwards from the coupling portion 210*g* and are respectively located at the openings O, such that the support portions 220*g* are movable within the openings O without being interfered by the flexible guiding component 100*g*.

Each of the support portions 220*g* includes an inclined part 221*g* and a contact part 222*g*, where the contact part 222*g* is upturned and is connected to the coupling portion 210*g* via the inclined part 221*g*. There is a bent structure formed between the inclined part 221*g* and the contact part 222*g* of the support portion 220*g*, and the bent structure contacts the substrate 30. This helps prevent the elastic component 200*g* from damaging the substrate 30 when using.

Since the activation assembly 10*g* has a low height, the flexible guiding component 100*g* may further include a plurality of holding structures 115*g* and 116*g*. The holding structures 115*g* are connected to the second covering parts 112*f* and respectively and partially cover the openings O. The holding structures 116*g* are connected to the first covering part 111*g* and located in the cavity S, and respectively contact different sides of the elastic component 200*g*. As shown, the holding structures 115*g* are able to hold the support portions 220*g* of the elastic component 200*g* in the openings O so as to prevent the support portions 220*g* from coming out of the openings O. In addition, the support portions 220*g* are spaced apart from the second covering parts 112*g* so as to prevent the flexible guiding component 100*g* from interfering with the support portions 220*g*. Furthermore, the coupling portion 210*f* is firmly held in position by the holding structures 116*g* of the flexible guiding component 100*g* during operation.

Note that the manner used to dispose the coupling portion 210*g* on the covering portion 110*g* may be modified as require; in some other embodiment, the coupling portion may be fixed to the covering portion via melting process.

In this embodiment, the coupling portion 210*g* of the elastic component 200*g* has a circular shape, but the present disclosure is not limited thereto; in some other embodiments, the coupling portion of the elastic component may have a square shape. In addition, the elastic component 200*g* have four support portions 220*g*, but the present disclosure is not limited thereto; in some other embodiments, the elastic component may have any number of the support portions.

Figure 23:
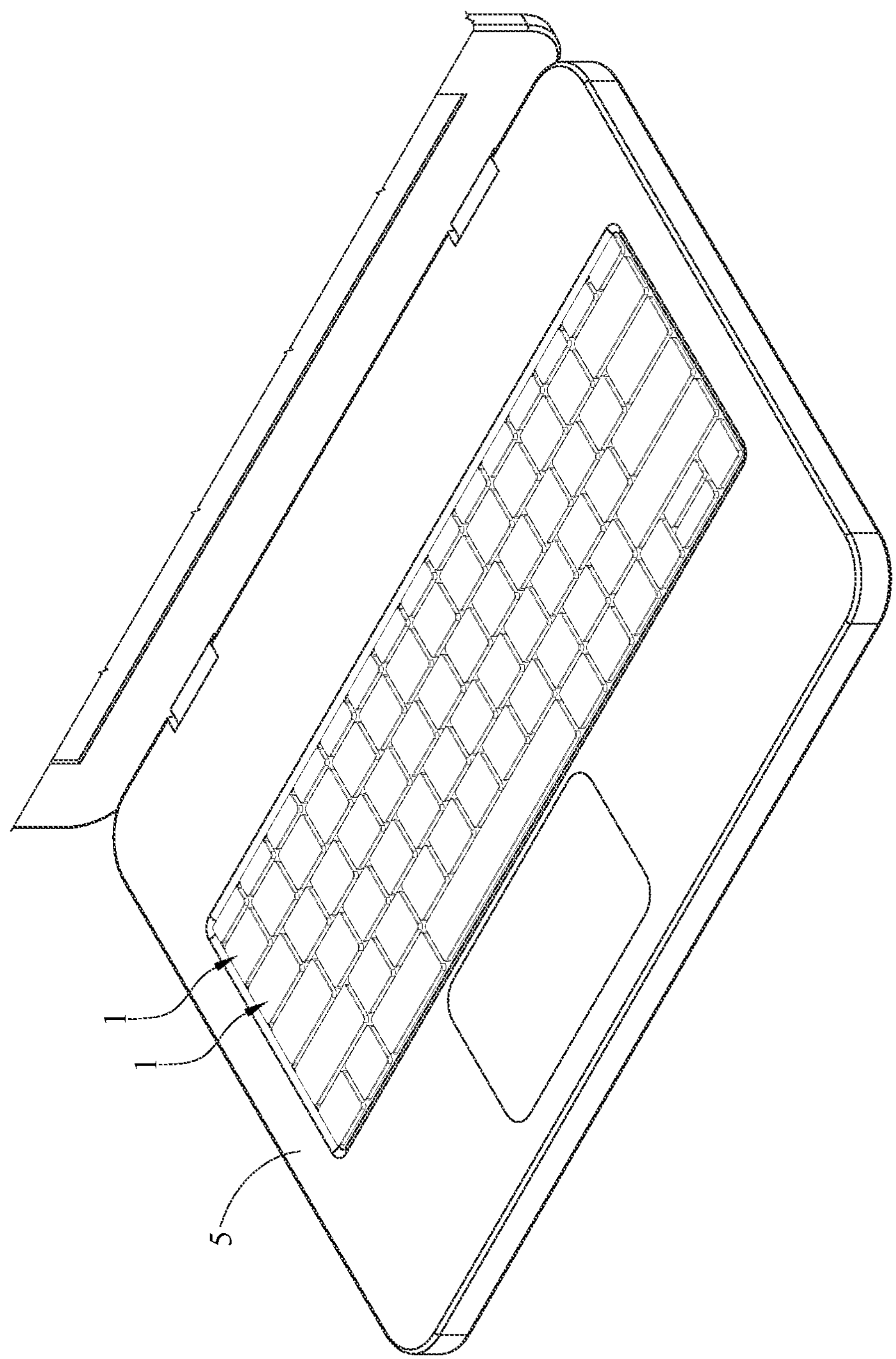
FIG. 23 is a perspective view of a keyboard according to a ninth embodiment of the disclosure.

Referring to FIG. 23, there is shown a perspective view of a keyboard 1000 according to a ninth embodiment of the disclosure.

In this embodiment, the keyboard 1000 may be applied to a notebook computer. The keyboard 1000 includes a casing 5 and a plurality of buttons 1. The buttons 1 are disposed on the casing 5. In this embodiment, the buttons 1 are the same as the button 1 shown in FIG. 1, and therefore the following paragraphs will not repeatedly introduce the details of the buttons 1.

Note that the activation assembly of each button 1 may be modified as required; in some other embodiment, each button of the keyboard may have the activation assembly shown in one of the previous embodiments.

According to the keyboard, the buttons, and activation assemblies disclosed in the above embodiments, the elastic component is held in position by the flexible guiding component; meanwhile, the flexible guiding component has the openings to avoid interference with the support portions of the elastic component during the deformation of the elastic component, such that the installation and the movement of the elastic component can be achieved by the flexible guiding component without any additional frame component. Therefore, the button can have a lower height for achieving a slim design and improving the tactile feedback.

Moreover, there is no gap between the coupling portion of the elastic component and the first covering part of the flexible guiding component, such that the elastic component can be moved along with the first covering part, thereby maintaining the tactile feedback of the button.

Furthermore, the flexible guiding component is made of soft rubber material, and the elastic component is made of metal material. Therefore, when the keycap 50 is released, the soft rubber material enables the flexible guiding component to recover to its original shape, and the elastic component made of metal material can help the flexible guiding component to recover to its original shape. Therefore, the button not only provides a strong tactile feedback, but also has a longer lifespan.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An activation assembly of a button, configured to be assembled with a substrate and a keycap, the activation assembly comprising:
- a flexible guiding component, comprising:
  - a covering portion, wherein the covering portion has a plurality of openings, a first surface and a second surface located opposite to the first surface, the covering portion is configured to be mounted on the substrate;
  - a first contact portion, and
  - a second contact portion, wherein the first contact portion and the second contact portion respectively protrude from the first surface and the second surface; and
- an elastic component, comprising:

a coupling portion, connected to the covering portion, wherein the coupling portion of the elastic component is attached on the second surface of the covering portion and the second contact portion is disposed through a hole of the coupling portion, or the coupling portion of the elastic component is embedded in the covering portion and located between the first surface and the second surface of the covering portion; and a plurality of support portions, connected to the coupling portion and respectively located in the plurality of openings.

2. The activation assembly according to claim 1, wherein the plurality of support portions extend outwards from the coupling portion, each of the plurality of support portions comprises an inclined part and a contact part connected to the inclined part, and the contact part is flat or upturned, and the contact part is configured to be in contact with the substrate.

3. The activation assembly according to claim 1, wherein each of the covering portion and the first contact portion has at least one hole.

4. The activation assembly according to claim 1, wherein the covering portion further has at least one holding structure, and the at least one holding structure contacts the elastic component.

5. The activation assembly according to claim 1, wherein the covering portion comprises a first covering part, a plurality of second covering parts, and a plurality of coupling parts, the plurality of second covering parts are connected to the first covering part, the plurality of second covering parts are spaced apart from one another, each of the plurality of openings is formed between adjacent two of the plurality of second covering parts, the plurality of coupling parts are connected to the first covering part via the plurality of second covering parts, and the plurality of coupling parts are configured to be fixed to the substrate.

6. The activation assembly according to claim 5, wherein the first covering part and the plurality of second covering parts are the same in thickness, and thicknesses of the first covering part and the plurality of second covering parts ranges from 0.2 millimeters to 0.5 millimeters.

7. The activation assembly according to claim 5, wherein the second contact portion has a convex curved surface located at a side of the second contact portion away from the first covering part.

8. The activation assembly according to claim 5, wherein the coupling portion has a pressing part, the pressing part is attached on the second contact portion, and the pressing part is configured to contact the substrate.

9. A button, comprising:

a support base;

a substrate, mounted on the support base and having a circuit;

an activation assembly, comprising:

a flexible guiding component, comprising a covering portion, a first contact portion, and a second contact portion, wherein the covering portion has a plurality of openings a first surface and a second surface located opposite to the first surface, the covering portion is mounted on the substrate, the first contact portion and the second contact portion respectively protrude from the first surface and the second surface; and an elastic component, comprising a coupling portion and a plurality of support portions, wherein the coupling portion is connected to the covering portion, the coupling portion of the elastic component is attached on the second surface of the covering portion and the second contact portion is disposed through a hole of the coupling portion, or the coupling portion of the elastic component is embedded in the covering portion and located between the first surface and the second surface of the covering portion, the plurality of support portions are connected to the coupling portion and are respectively located in the plurality of openings;

a restoring component, wherein a side of the restoring component is mounted on the support base; and a keycap, mounted on another side of the restoring component, wherein the keycap is movable relative to the support base via the restoring component to move the second contact portion of the activation assembly to touch the circuit.

10. The button according to claim 9, wherein the plurality of support portions extend outwards from the coupling portion, each of the plurality of support portions comprises an inclined part and a contact part connected to the inclined part, and the contact part is flat or upturned, and the contact part is configured to be in contact with the substrate.

11. The button according to claim 9, wherein each of the covering portion and the first contact portion has at least one hole.

12. The button according to claim 9, wherein the covering portion further has at least one holding structure, and the at least one holding structure contacts the elastic component.

13. The button according to claim 9, wherein the covering portion comprises a first covering part, a plurality of second covering parts, and a plurality of coupling parts, the plurality of second covering parts are connected to the first covering part, the plurality of second covering parts are spaced apart from one another, each of the plurality of openings is formed between adjacent two of the plurality of second covering parts, the plurality of coupling parts are connected to the first covering part via the plurality of second covering parts, and the plurality of coupling parts are configured to be fixed to the substrate.

14. The button according to claim 13, wherein the first covering part and the plurality of second covering parts are the same in thickness, and thicknesses of the first covering part and the plurality of second covering parts ranges from 0.2 millimeters to 0.5 millimeters.

15. The button according to claim 13, wherein the second contact portion has a convex curved surface located at a side of the second contact portion away from the first covering part.

16. The button according to claim 13, wherein the coupling portion has a pressing part, the pressing part is attached on the second contact portion, and the keycap is configured to move the pressing part to touch the circuit of the substrate.

17. A keyboard, comprising:

a casing; and a plurality of buttons disposed on the casing, wherein each of the plurality of buttons comprises:

a support base;

a substrate, mounted on the support base and having a circuit;

an activation assembly, comprising:

a flexible guiding component, comprising a covering portion, a first contact portion, and a second contact portion, wherein the covering portion has a plurality of openings, a first surface and a second surface located opposite to the first surface, the covering portion is mounted on the substrate, the first contact portion and the second contact portion respectively protrude from the first surface and the second surface; and an elastic component, comprising a coupling portion and a plurality of support portions, wherein the coupling portion is connected to the covering portion, the coupling portion of the elastic component is attached on the second surface of the covering portion and the second contact portion is disposed through a hole of the coupling portion, or the coupling portion of the elastic component is embedded in the covering portion and located between the first surface and the second surface of the covering portion, the plurality of support portions are connected to the coupling portion and are respectively located in the plurality of openings;

a restoring component, wherein a side of the restoring component is mounted on the support base; and a keycap, mounted on another side of the restoring component, wherein the keycap is movable relative to the support base via the restoring component to move the second contact portion of the activation assembly to touch the circuit.

18. The keyboard according to claim 17, wherein the covering portion comprises a first covering part, a plurality of second covering parts, and a plurality of coupling parts, the plurality of second covering parts are connected to the first covering part, the plurality of second covering parts are spaced apart from one another, each of the plurality of openings is formed between adjacent two of the plurality of second covering parts, the plurality of coupling parts are connected to the first covering part via the plurality of second covering parts, and the plurality of coupling parts are configured to be fixed to the substrate.

* * * * *